US012574803B2

(12) United States Patent
Di Girolamo et al.

(10) Patent No.: US 12,574,803 B2
(45) Date of Patent: Mar. 10, 2026

(54) MULTICAST-BROADCAST SERVICES MOBILITY AND SERVICE CONTINUITY

(71) Applicant: INTERDIGITAL PATENT HOLDINGS, INC., Wilmington, DE (US)

(72) Inventors: Rocco Di Girolamo, Laval (CA); Pascal Adjakple, Great Neck, NY (US); Yifan Li, Conshohocken, PA (US); Kyle Pan, Saint James, NY (US); Zhuo Chen, Claymont, DE (US); Guodong Zhang, Woodbury, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 272 days.

(21) Appl. No.: 18/249,760

(22) PCT Filed: Oct. 21, 2021

(86) PCT No.: PCT/US2021/056033
§ 371 (c)(1),
(2) Date: Apr. 20, 2023

(87) PCT Pub. No.: WO2022/087253
PCT Pub. Date: Apr. 28, 2022

(65) Prior Publication Data
US 2023/0388866 A1 Nov. 30, 2023

Related U.S. Application Data

(60) Provisional application No. 63/094,537, filed on Oct. 21, 2020.

(51) Int. Cl.
*H04W 36/00* (2009.01)

(52) U.S. Cl.
CPC .................. *H04W 36/0007* (2018.08); *H04W 36/0085* (2018.08); *H04W 36/0064* (2023.05)

(58) Field of Classification Search
CPC ......... H04W 36/0007; H04W 36/0085; H04W 36/0064; H04W 24/08; H04W 36/0088; H04W 48/16; H04W 48/20
See application file for complete search history.

(56) References Cited

U.S. PATENT DOCUMENTS

2005/0090278 A1 4/2005 Jeong et al.
2013/0083715 A1* 4/2013 Etemad ................. H04W 76/28
370/312

(Continued)

FOREIGN PATENT DOCUMENTS

WO 2016/119212 A1 8/2016

OTHER PUBLICATIONS

"Discussion on MBS mobility with service continuity," 3GPP TSG-RAN WG2 Meeting #111 electronic R2-2007414, Aug. 17-Aug. 28, 2020, pp. 4.

(Continued)

*Primary Examiner* — Kan Yuen
(74) *Attorney, Agent, or Firm* — Flaster Greenberg P.C.

(57) ABSTRACT

Wireless User Equipment, UE, and network apparatuses may be adapted to facilitate continuity of Multicast/Broadcast Service, MBS, across cells. A UE in idle/inactive mode, for example, may receive MBS assistance information comprising scheduling information defining MB S reception windows and perform a cell re selection evaluation process accordingly. An UE in connected mode may conduct and report MB S quality measurements and receive an RRC reconfiguration comprising an MB S configuration for a target cell, determine that MBS transmission progress differs between the source cell and the target cell, and recover lost (Continued)

Cell not providing MBS
service

MBS PDUs or delete duplicate MBS PDUs accordingly. A network apparatus, such as a gNB for example, may map a GPRS Tunneling Protocol Sequence Number of an MBS PDU, to a Packet Data Convergence Protocol Sequence Number in a target cell, and determine an MB S configuration for use by a UE requesting a handover accordingly.

18 Claims, 30 Drawing Sheets

(56) References Cited

U.S. PATENT DOCUMENTS

| | | | | |
|---|---|---|---|---|
| 2013/0107864 | A1* | 5/2013 | Lee | H04L 65/611 |
| | | | | 370/329 |
| 2015/0215745 | A1* | 7/2015 | Lee | H04W 72/30 |
| | | | | 370/312 |
| 2016/0249266 | A1 | 8/2016 | Kim et al. | |
| 2017/0245121 | A1 | 8/2017 | Jung et al. | |
| 2018/0249387 | A1* | 8/2018 | Zhang | H04W 36/0094 |
| 2018/0270723 | A1* | 9/2018 | Kim | H04W 48/12 |
| 2019/0028854 | A1* | 1/2019 | Hua | H04W 36/249 |
| 2019/0380078 | A1* | 12/2019 | Fujishiro | H04W 48/20 |
| 2020/0045593 | A1 | 2/2020 | Jung et al. | |
| 2020/0059835 | A1* | 2/2020 | Kim | H04W 36/0044 |
| 2020/0187084 | A1 | 6/2020 | Fujishiro et al. | |
| 2022/0167198 | A1* | 5/2022 | Fujishiro | H04W 24/10 |
| 2023/0027425 | A1* | 1/2023 | Zhu | H04W 36/0007 |

OTHER PUBLICATIONS

"Mechanisms to enable simultaneous operation of NR Unicast+LTE MBMS," 3GPP Draft, R2-2004535, Jun. 1-12, 2020, pp. 5.

"NR Multicast dynamic PTM PTP switch with service continuity," 3GPP TSG-RAN WG2 Meeting #111e R2-2006794, Aug. 17-28, 2020, pp. 5.

"Technical Specification Group Radio Access Network; Evolved Universal Terrestrial Radio Access (E-UTRA) and Evolved Universal Terrestrial Radio Access Network (E-UTRAN)," 3GPP TS 36.300 V16.3.0, 2020, Release 16, pp. 390.

"Technical Specification Group Radio Access Network; Evolved Universal Terrestrial Radio Access (E-UTRA); Radio Resource Control (RRC)," 3GPP TS 36.331 V16.2.0, 2020, Release 16, pp. 1081.

"Technical Specification Group Radio Access Network; Evolved Universal Terrestrial Radio Access (E-UTRA); User Equipment (UE) procedures in idle mode," 3GPP TS 36.304 V16.2.0, 2020, Release 16, pp. 64.

"Technical Specification Group Radio Access Network; NR; NR and NG-RAN Overall Description," 3GPP TS 38.300 V16.3.0, 2020, 2020, Release 16, pp. 148.

"Technical Specification Group Radio Access Network; NR; User Equipment (UE) procedures in Idle mode and RRC Inactive state," 3GPP TS 38.304 V16.2.0, 2020, Release 16, pp. 39.

"Technical Specification Group Radio Access Network; Study on Scenarios and Requirements for Next Generation Access Technologies," 3GPP TR 38.913 V15.0.0, 2018, Release 15, pp. 39.

"Technical Specification Group Services and System Aspects; Service requirements for the 5G system; Stage 1," 3GPP TS 22.261 V16.11.0, 2020, Release 16, pp. 72.

"Work Item on NR Multicast and Broadcast Services," 3GPP TSG Ran Meeting #88-e RP-201038, Jun. 29-Jul. 3, 2020, pp. 6.

Vivo, "Discussion on idle and inactive mode UEs," 3GPP Draft, R2-2007037, Aug. 17-28, 2020, pp. 5.

* cited by examiner

Cell not providing MBS service

Figure 9:
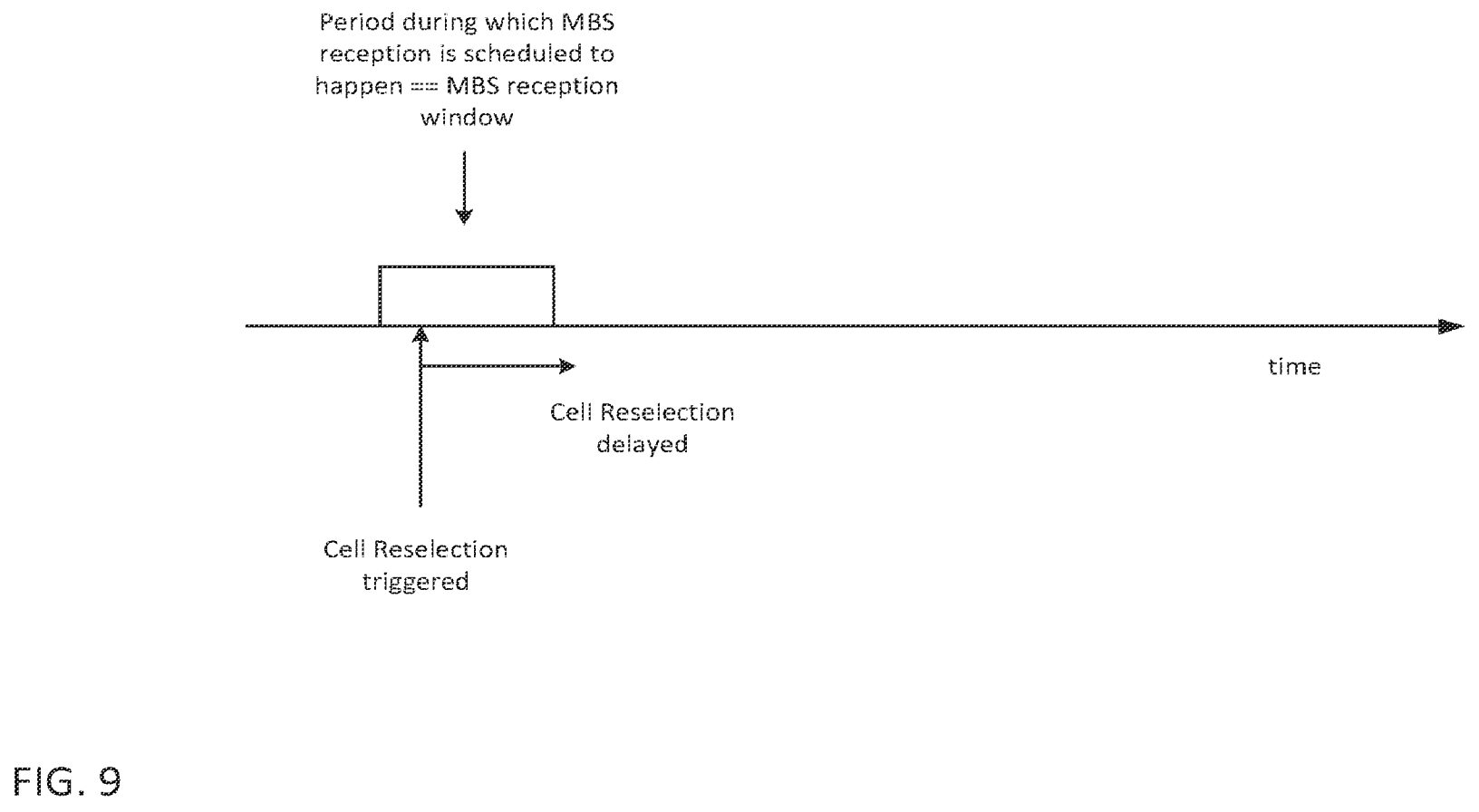

Period during which MBS reception is scheduled to happen === MBS reception window Cell Reselection delayed Cell Reselection triggered time

MULTICAST-BROADCAST SERVICES MOBILITY AND SERVICE CONTINUITY

CROSS-REFERENCE TO RELATED APPLICATIONS

This application is the National Stage Application of International Patent Application No. PCT/US2021/056033, filed Oct. 21, 2021, which claims the benefit of U.S. Provisional Patent Application No. 63/094,537, Oct. 21, 2020, titled "Multicast-broadcast services mobility and service continuity," the content of which is hereby incorporated by reference herein.

BACKGROUND

This disclosure pertains to Multicast/Broadcast Services (MBS) for wireless systems, such as systems described in, for example: TS 22.261, Service requirements for the 5G system, V16.11.0; TR 38.913, Study on scenarios and requirements for next generation access technologies, V15.0.0; RP-201038, Work Item on NR Multicast and Broadcast Services; TS 38.304, User Equipment (UE) procedures in idle mode and in RRC Inactive state, V16.2.0; TS 36.304, User Equipment (UE) procedures in idle mode and in RRC Inactive state, V16.2.0; TS 38.300, NR; Radio Resource Control (RRC); Protocol specification, V16.3.0; TS 36.331, Evolved Universal Terrestrial Radio Access (E-UTRA); Radio Resource Control (RRC); Protocol specification, V16.2.0; TS 36.300, Evolved Universal Terrestrial Radio Access (E-UTRA) and Evolved Universal Terrestrial Radio Access Network (E-UTRAN); Overall description; Stage 2, V16.3.0; R2-2007414, Discussion on MBS mobility with service continuity, CMCC; R2-2006794, NR Multicast dynamic PTM PTP switch with service continuity, Qualcomm Inc; and R2-2004535, Mechanisms to enable simultaneous operation of NR Unicast+LTE MBMS, Qualcomm Incorporated, FirstNet, AT&T, Telstra, Academy of Broadcasting Science, Shanghai Jiao Tong University, British Broadcasting Corporation, European Broadcasting Union, Institut für Rundfunktechnik.

SUMMARY

Techniques are disclosed herein to facilitate multicast-broadcast services (MBS) in new radio (NR) solutions such as 5G by addressing, for example: limitations that have been observed in LTE and UTRAN MBMS operation; unique characteristic of 5G NR; and requirements set out by the envisioned 5G MB S use cases. Five techniques are disclosed. In a first technique include the use of MBS assistance information to provide to UEs in order to support 5G NR as well as the requirements of service continuity and dynamic transmission areas. In a second technique use of UE assistance information sent by the UE in order to support 5G NR as well as the requirements of service continuity, dynamic switching between PTM and PTP, and dynamic transmission areas. In a third technique, modified intra-frequency and inter-frequency measurement rules may be used to allow for MBS coverage holes resulting from dynamic transmission areas. In a fourth technique, modified cell reselection evaluation rules to allow for service continuity and address the progress gap problems. In a fifth technique, modified handover procedures may be used to allow for lossless MBS transmissions and to deal with duplicate reception of MBS PDUs.

Idle/Inactive Mode Behavior at UE

An Idle/Inactive mode UE with an ongoing MBS service, or interest in an MBS service, may receive MBS assistance information from network. The MBS assistance information may include scheduling information for the MBS service as part of the MBS assistance information, the scheduling information defining MBS reception windows. The UE may perform intra-frequency and inter-frequency measurements based on the received MBS assistance information, and/or perform cell reselection evaluation process based on the received MBS assistance information.

The MBS assistance information may include serving cell information such as priority of the MBS traffic, priority thresholds for MBS traffic, and/or information for maximum reselection delay timer for each service. For the serving cell, the MBS assistance information may include priority threshold for unicast traffic, interfrequency measurement thresholds, serving cell ranking offset for cell reselection evaluation, and/or information for maximum reselection delay timer.

The MBS assistance information may include neighbor cell information. This may include, for each service, a bandwidth part where MBS service is carried; an indication of how the MBS service is carried; a list of frequencies over which MBS service is carried; and/or whether the MBS service transmission progress is aligned with the current serving cell. For each intra-frequency neighbor cell, the MBS assistance information may include whether the gNB can be triggered by UE to start an MBS service, and/or neighbor cell ranking offset for cell reselection evaluation. For each inter-frequency neighbor cell, the information may include whether the gNB can be triggered by UE to start an MBS service, and an inter-frequency neighbor cell selection quality offset, for example.

In the cell reselection evaluation process, the UE may use the MBS assistance information to determine whether to prioritize cell reselections for MBS service continuity (MBS cell reselection) or to prioritize cell reselections to better receive paging messages, better receive system information messages, and/or minimize interference during connection establishment procedure (unicast cell reselection).

In the cell reselection evaluation process, the UE reselects a new cell. If the UE is receiving an MBS service during an MBS reception window, the UE may delay reselecting a new cell until after the MBS reception window ends or maximum reselection delay timer expires. If the UE will be receiving an MBS service during an MBS reception window within X seconds, the UE may delay reselecting a new cell until after the MBS reception window ends or maximum reselection delay timer expires. In cases where the new reselected cell is not the best serving cell in terms of received signal quality, the UE may initiate another cell reselection evaluation process prior to any connection establishment procedure, and during the cell reselection evaluation process, the UE may prioritize unicast cell reselection After camping on the reselected cell, the UE may detect whether duplicate PDUs have been received for the MBS service and discard the duplicates. Similarly, the UE may detect whether there are any missing PDUs, and if so move to connected mode to request the missing PDUs. The UE may also keep track of the PDCP PDU SN of the last received PDU in the initial serving cell and compare this value with the PDCP PDU SN of the received packets in the reselected cell.

The UE may further be arranged to determine whether the MBS service is not being transmitted in the reselected cell and check whether the reselected cell is from a gNB that allows UE to trigger the gNB to initiate the MBS service. If so, the UE may transition to connected mode to request that the gNB start providing the service in the reselected cell.

Several options are available for the cell reselection evaluation process. The UE may be arranged to de-prioritize cells from gNBs that do not support MBS, or cells which are not capable of providing the desired MBS service, or cells that are not progress aligned with the current serving cell. Similarly, in the cell reselection evaluation process the UE may not consider a cell as a candidate for cell reselection if the cell is from gNBs that do not support MBS, or the cell is not capable of providing the desired MBS service, or the cell is not progress aligned with the current serving cell. Further, as part of the cell reselection evaluation process the UE may prioritize cells from a gNB that supports MBS, and/or cells that offer the desired MBS service, and/or cells that may be triggered to offer the desired MBS service, and/or cells that are progress aligned with the current serving cell. Further, as part of the cell reselection evaluation process, the UE may only consider a cell as a candidate for cell reselection if the cell is from a gNB that supports MBS, and/or cell offers the desired MBS service, and/or cell may be triggered to offer the desired MBS service, and/or cell is progress aligned with the current serving cell.

In cell reselection evaluation process, the UE may consider cells that are not capable of offering the desired MBS service as not suitable for MBS. The UE may not consider this cell as candidate for reselection for a period of time, e.g., for 300 seconds.

Connected Mode Behavior at UE:

A Connected mode UE with an ongoing MBS service, or interest in an MBS service, may be configured for measurements by the network and sending a measurement report to the source gNB. The UE may then receive an RRC reconfiguration from the network with an MBS configuration for a target cell. If the target cell MBS transmission progress is ahead of the source cell MBS transmission progress, the UE may recover the lost/missing MBS PDUs. If the target cell MBS transmission progress is behind that of the source cell MBS transmission progress, the UE may determine and delete the duplicate received MBS PDUs The measurements may include MBS quality measurements, such as signal quality of reference signals in MBS transmissions, HARQ statistics for MBS transmissions.

The MBS configuration for the target cell may have a PTM radio bearer and a linked PTP radio bearer that may share the same PDCP entity, whereby the UE recovers the lost/missing MBS PDUs from the linked PTP radio bearer.

The linked PTP radio bearer may be used only temporarily, e.g., as long as the target cell needs to transmit lost/missing PDUs or until a timer expires.

The MBS configuration for the target cell may have an ongoing PTM radio bearer and a special shared PTM radio bearer, the latter used for handover PDUs. Handover PDUs are PDCP PDUs that would have been sent to the UE by the source cell if the UE did not perform the handover. The UE may recover the lost MBS PDUs from the special shared PTM radio bearer. The SDAP QFI field may be used to link the MBS PDUs carried on the special shared PTM radio bearer and the ongoing PTM radio bearer. An end marker PDU may be transmitted via the special shared PTM radio bearer to signal that the handover PDUs for this UE have ended and that the UE can stop/release the special shared PTM radio bearer.

The RRC reconfiguration message may provide the MBS configuration and an indication of the last MBS PDU the UE should receive in the source cell. For example, the PDCP PDU SN of this MBS PDU as assigned from the source cell.

The MBS configuration for the target cell may have a PTM radio bearer configuration or a PTP radio bearer configuration, whereby the UE does not release the PTM radio bearer on the source cell. After receiving the last MBS PDU from the source cell PTM radio bearer, the UE may autonomously release the PTM radio bearer.

The RRC reconfiguration message may provide the MBS configuration and information to allow the UE to determine which MBS PDUs are lost and/or received as duplicate. Such information may include an indication of the offset in SN between the source cell and the target cell. The UE may use the PDCP PDU SN in the target cell and the offset, to determine and delete the duplicate received MBS PDUs and to determine those PDCP PDUs that have been lost. The information may include the target cell PDCP PDU SN of the last duplicate MBS PDU (Last_SN), the target cell PDCP PDU SN of the first PDCP PDU following the last successful PDCP PDU received in the source cell (First_SN), an indication if there have been lost MBS PDUs, and/or an indication of the number of lost MPS PDUs. The UE may then determine and delete the duplicate received MBS PDUs (those with a PDCP PDU SN less than or equal to Last_SN or those with a PDCP PDU SN less than First_SN), for example.

Connected Mode Behavior at a Target gNB.

A gNB may be arranged to use a mapping rule to map the GTP SN of the MBS PDU to a PDCP SN used in the cell. The gNB may receive a handover request from a first gNB for a UE and determine that the MBS transmission progress (the transmission of MBS PDUs) in a target cell is different from the MBS transmission progress in a source cell of the first gNB. The gNB may then select an MBS configuration to be used by the UE in the target cell and send UE's MBS configuration to the first gNB. The gNB may then receive an RRC reconfiguration complete message from the UE and transmit the MBS service on the selected MBS configuration in the target cell.

If the handover request includes an indication of the source cell MBS transmission progress (e.g., the last PDCP PDU SN successfully sent to the UE) or a mapping rule used by the first gNB over the source cell, the gNB may further determine that the target cell MBS transmission progress is ahead of the source cell MBS transmission progress and recover the lost MBS PDUs.

If the handover request includes an indication of the source cell MBS transmission progress (e.g., the last PDCP PDU SN successfully sent to the UE) or a mapping rule used by the first gNB over the source cell, the gNB may further determine that the target cell MBS transmission progress is behind that of the source cell MBS transmission progress, and the gNB may assist the UE in detecting the duplicate MBS PDUs The gNB may further receive handover PDUs (e.g., copies of PDCP PDUs that would have been sent to UE if not for the handover) if the MBS transmission in the source cell is behind the MBS transmission in the target cell on the selected MBS configuration The gNB may further recover the MBS PDU from the handover PDUs and determine the GTP SN of the recovered MBS PDU using the mapping rule over the source cell. The gNB may then retransmit the recovered MBS PDU on the selected MBS configuration and send an indication to first gNB to stop forwarding handover PDUs for the UE.

The gNB may provide the MBS service over multiple PTM radio bearers and determine the MBS configuration for the UE by selecting the PTM radio bearer that minimizes the lost MBS PDUs.

The MBS configuration to be used by the UE may include a PTM radio bearer and a linked PTP radio bearer configured to share the PDCP entity. The gNB may recover the MBS PDU from the handover PDUs and determine the GTP SN of the recovered MBS PDU using the mapping rule over the source cell. The gNB may then transmit the recovered MBS PDUs on the PTP radio bearer and send an indication to first gNB to stop forwarding handover PDUs for the UE. The linked PTP radio bearer may be released after a timer expires or the recovered MBS PDUs have been transmitted.

The MBS configuration to be used by the UE may include a PTM radio bearer and a special shared PTM radio bearer, the latter configured for transmission of handover PDUs.

The gNB may further recover the MBS PDU from the handover PDUs and determine the GTP SN of the recovered MBS PDU using the mapping rule over the source cell. The gNB may then transmit the recovered MBS PDU on the special shared PTM radio bearer and send an indication to the UE that all handover PDUs for this UE have been transmitted.

The MBS configuration to be used by the UE may include a PTM radio bearer or a PTP radio bearer, as well as an indication of the last MBS PDU the UE should receive in the source cell.

The gNB may further recover the MBS PDU from the handover PDUs, determining the GTP SN of the recovered MBS PDU using the mapping rule over the source cell, and determining the PDCP PDU SN that was used to transmit this MBS PDU. The MBS configuration to be used by the UE may include an indication of the MBS PDUs that the UE will receive as duplicate. The UE may should have already received these from the source cell.

The gNB may be arranged such that selecting the MBS configuration to be used by the UE in the target cell is based on the current MBS configuration in the cell, the number of UEs in the cell using this configuration, and thresholds to determine when to switch between configurations. For example, where if the number of UEs using a PTP configuration for this MBS is above a threshold, the gNB may determine the earliest MBS PDU that has yet to be transmitted among all the transmissions to all the UEs. That is, the PTP configuration that is most behind in terms of MBS transmission progress (as all PTP radio bearers to the UEs is progressing at a different pace). The gNB may then switch the MBS configuration from PTP to PTM and may send a reconfiguration message to each of the UEs, where the reconfiguration message includes an indication of which MBS PDUs will be duplicate for this UE, starting the PTM transmission from the earliest MBS PDU.

A gNB may be arranged to send a message to a target gNB providing one or more of an MBS service identifier, a mapping rule, and a PDCP PDU SN of a last successfully transmitted PDCP PDU. The gNB may then receive an acknowledgement pertaining to PTM radio bearers providing the MBS service and associated information. The gNB may receive a handover request acknowledgement from the target gNB for the target cell, determine whether the source cell MBS transmission progress is ahead or behind the MBS transmission progress of the target cell. If transmission progress is behind, send the missing PDUs to the target gNB, as handover PDUs, for transmission over the target cell. The gNB message exchanges with the target gNB may be over the Xn interface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings.

FIG. 9 is a timing diagram of an example of cell reselection triggered during MBS reception.

DETAILED DESCRIPTION

Acronyms and Terms

Figure 1A:
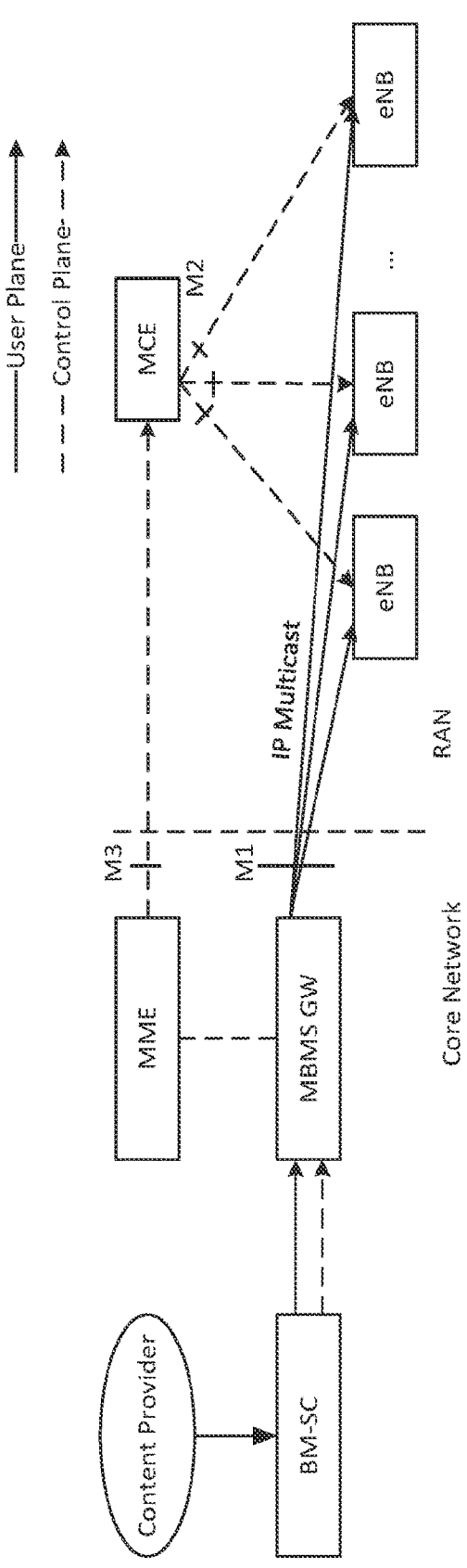
FIG. 1A is block diagram a of an example of MBSFN transmission.

Table 1 of the Appendix describes many acronyms used herein. The following terms are used herein.

Multicast Service: A unidirectional point-to-multipoint service in which data is efficiently transmitted from a single source to a multicast group in the associated multicast service area. Multicast services can only be received by such users that are subscribed to the specific multicast service and have joined the multicast group associated with the specific service.

Broadcast Service: A unidirectional point-to-multipoint service in which data is efficiently transmitted from a single source to multiple UEs in the associated broadcast service area. Broadcast services may be received by all users who have enabled the specific broadcast service locally on their UE and who are in the broadcast area defined for the service.

Service Continuity: In relation to MBS, Service Continuity implies that the UE would continue to receive (with no or little service interruption) an MBS service despite changing serving cell, changing RRC state, or changing RAN delivery method for the MBS service. For example, this may mean without any loss of MBS PDUs.

PTP: A term used in the radio access network to denote a case that the over the air transmissions are from a single RAN node to a single UE.

PTM: A term used in the radio access network to denote a case that the over-the-air transmissions are from a single RAN node to multiple UEs. PTM transmissions from multiple cells may be combined to create a Multi-Cell PTM transmission nonMBS operation: This refers to Connected mode operation where the network and/or UE do not support MBS.

MBS Session: This would be the MBS equivalent of a PDU session. It could be a session to deliver the multicast communication service. A multicast session is characterized by the content to send, by the list of UEs that may receive the service and optionally by a multicast area where to distribute it. Alternatively, it could be a session to deliver the broadcast communication service. A broadcast session is characterized by the content to send and the geographical area where to distribute it.

Shared PTM bearer: A bearer that is configured through system information and can be used in all UE states (Idle, Inactive, Connected).

Dedicated PTM bearer: A PTM bearer that is configured through dedicated signaling MBS reception window: Window over which a gNB may transmit the MBS services. In Idle/Inactive mode, the MBS transmission will be scheduled, and this scheduling information is included in the MBS assistance information. The schedule provides MBS reception windows. For example, in LTE SC-PTM deployments, these windows are described by DRX patterns—with ON and OFF times, and with ON times extended through activity.

MBS cell reselection: a reception procedure where the UE prioritizes cells that offer MBS service over cells that do not offer MBS service.

Unicast cell reselection: The Release 16 NR cell reselection procedure, where the UE always tries to camp on the best cell (as determined by received signal quality).

Handover PDUs: PDUs from a source cell of a source gNB that need to be transmitted to the UE over the target cell via the target gNB in order to guarantee lossless.

Lossless Handover: A handover in which no data is lost as the UE moves from source cell to a target cell.
LTE MBMS Overview and Limitations Multicast/Broadcast Multimedia services (MBMS) are characterized by the distribution of common interest content, from one source entity to a number of receive entities that are interested in the service. Mobile networks are primarily designed for unicast services, and as a result not optimized for multicast/broadcast services. Providing multicast/broadcast services therefore requires optimizations in how the traffic from these services is transported over the core network and over the radio access network.

The support of MBMS over LTE networks has evolved considerably over the various releases of LTE. Release 8 was the initial release of LTE. There was no MBS support. Release 9 related to the use case of video broadcast and introduced changes to RAN and system architecture. MBSFN was included but on a shared carrier. Releases 10-12 added counting, service continuity, and MBMS operation on Demand (MooD).

Release 13 added SC-PTM, and mostly addressed public safety use cases. Release 14 added SC-PTM for V2X use cases to address latency considerations and IoT use cases to address reaching a large number of constrained UEs—possibly in power savings mode. Release 14 also included FeMBMS (EN-TV) and MBMS dedicated carrier, new frame structure, receive only mode (i.e., no SIM card).

Release 16 included enhancements to terrestrial broadcast (new frame structures, new cyclic prefixes) to find solutions to allow EN-TV to meet 5G broadcast requirements for "terrestrial broadcast."

LTE networks have supported MBMS since Release 9, through a mechanism referred to as MBSFN (Multicast Broadcast Single Frequency Network). MBMS was provided on carriers that were shared with unicast services. MBSFN required new logical entities in the core network and relied on simultaneous transmission of the same MBMS traffic, from one or more eNBs.

FIG. 1A shows the LTE architecture for MBSFN transmission. The new logical entities include the BM-SC, the MBMS GW and the MCE. In addition, each of the eNBs shown in FIG. 1A is involved in the MBSFN transmission. The transmissions from these eNBs define an MBSFN Area where a UE receives MBSFN transmissions from multiple eNBs.

The transmissions are over a new Multicast transport channel (MCH) that is mapped to a new physical channel (PMCH—Physical Multicast Channel). The PMCH is only allowed to be transmitted in reserved subframes. That is, subframes that have been set aside by the eNB for the purpose of MBSFN transmission. These subframes are used to carry the MBMS control plane information Multicast Control Channel (MCCH) and the MBS user plane traffic Multicast Traffic Channel (MTCH).

From system information, the UEs determine the subframes set aside for MBS, which of these subframes carry MCCH, as well as the configuration used for the PMCH—the latter allowing the UE to decode the traffic received on the PMCH in the reserved subframes. The UE then reads the MCCH to obtain scheduling information for the MBMS user plane traffic. That is, which of the reserved subframes contain a flow from a particular multicast/broadcast flow. UEs can then use this scheduling information to determine the multicast/broadcast flows they are interested in and receive/decode the MBMS traffic. UEs monitor the MCCH to determine if there is any change in the MBMS service offering.

Of note for MBSFN operation, in LTE MBMS reception is possible for RRC_CONNECTED and RRC_IDLE UEs. Only a single transport block may be transmitted in each reserved subframe. Only a single transmission is used for transport channel MCH. Neither blind HARQ repetitions nor RLC quick repeat are available. Logic channel MTCH and MCCH use the RLC-UM mode (whose configuration is fixed and known by the UEs.)

Release 10 introduced a RAN-based counting of UEs in connected mode interested in an MBMS service. This release also allowed the RAN to use any unused MBSFN subframes for unicast transmission. Lastly, this release enhanced the admission control for MBMS sessions by the introduction of the allocation and retention priority session parameters. Release 11 introduced service acquisition and service continuity in multi-frequency deployments where the MBMS service is provided via more than one frequency. Initial releases of eMBMS assumed that MBMS features did not affect mobility procedures in E-UTRA. Thus, some UEs that were receiving or interested in MBMS services were unable to receive MBMS services due to cell reselection in RRC_IDLE or handover in RRC_CONNECTED. To address this issue, the network could provide assistance information to inform UEs about mapping information between carrier frequencies and MBMS services, and transmission timing of MBMS services. By using the assistance information, when the UE was interested in a particular MBMS service, the UE in RRC_IDLE could autonomously set the carrier frequency carrying the MBMS service to the highest cell reselection priority for the scheduled time. As a result, it was likely that the UE would reselect to a cell on the carrier frequency carrying the MBMS service. Also, in Release 11, for a UE in RRC_CONNECTED, the UE could inform the serving cell about carrier frequencies where MBMS services of interest were scheduled to be transmitted. For this purpose, the RRC layer introduced a new uplink message called the MBMSInterestIndication message. The intention was that the eNB would use this information to select a target cell for handover.

Release 12 introduced as one of the main enhancements: MooD (MBMS operation on Demand), which enables automatic and seamless MBMS service activation and deactivation based on the UEs' service consumption reporting.

A major enhancement was the introduction of Single-Cell Point-to-Multipoint in Release 13. SC-PTM uses the same new logical entities in the core network (BM-SC, MBMS-GW) but does not rely on simultaneous transmission from multiple eNBs (as in the MBSFN case). Rather each eNB individually schedules its own MBMS transmissions. These transmissions are transported over the Downlink Shared Channel (DL-SCH) and carried on the Physical Downlink Shared Channel (PDSCH). As a result, unicast traffic and MBMS traffic are multiplexed over the DL-SCH, resulting in more flexible and dynamic radio resource allocation for MBMS transmissions. Also, since the scheduling is not left to the MCE to be synchronized across eNBs, the end-to-end latency is expected to be reduced. For SC-PTM, MBMS is transmitted in the coverage of a single cell. The SC-PTM transmission carries both a control channel (SC-MCCH) and traffic channel (SC-MTCH). SC-MCCH and SC-MTCH transmissions are each indicated by a logical channel specific RNTI on the Physical Downlink Control Channel (PDCCH). Specifically, an SC-RNTI used to scramble CRC in PDCCH scheduling SC-MCCH and G-RNTI used to scramble CRC in PDCCH for SC-MTCH. Note that there is a one-to-one mapping between each MBMS session supported in a cell, and G-RNTI used for the reception of the DL-SCH to which a SC-MTCH is mapped. Even though SC-PTM is scheduled like the unicast traffic, it does not rely on any UL feedback, and as a result SC-PTM does not support link adaptation or HARQ operation. During the 3GPP work item phase there was some discussion to exploit unicast UL feedback in order to allow advanced link adaptation schemes such as adaptive modulation and coding for groups with a small number of UEs. However, this feature was finally not standardized in Rel'13. In addition, MBMS transmissions can be configured with a MBMS specific DRX pattern, so that the UE needs not continuously monitor for the SC-PTM RNTIs. This pattern follows a simple ON and OFF period, with the DRX Active time being extended when the UE receives SC-PTM traffic. This MBMS specific DRX pattern is independent of the UE specific DRX pattern.

In addition, of note for SC-PTM operation, MBMS reception is possible for RRC_CONNECTED and RRC_IDLE UEs. Only a single transmission is used for DL-SCH. Neither blind HARQ repetitions nor RLC quick repeat are available. SC-MTCH and SC-MCCH use the RLC-UM mode (whose configuration is fixed and known by the UEs.)

Release 14 introduced MBSFN and SC-PTM for V2X (vehicular to everything) communications, SC-PTM for Internet of Things (IoT), eMTC (enhanced Machine-Type Communication), and NB-IoT (NarrowBand-IoT). Release 14 also introduced many features to enhance the delivery of TV services with eMBMS, to expand the reach of MBMS into traditional TV receivers and to enable the deployment of dedicated broadcast eMBMS networks supporting public broadcasting requirements. Services provided may be distributed in such a way that they can be received by all, including those who are not mobile subscribers. This is also referred to as Receive-only-Mode (ROM) or Free-to-Air.

Release 16 focused on enhancements to terrestrial broadcast (specifically new frame structures, new cyclic prefixes) to find solutions to allow EN-TV to meet 5G broadcast requirements for "terrestrial broadcast"

Despite the progress made over the many LTE releases, MBMS over LTE still suffers from a number of limitations. A few of these limitations are described below.

Limitations regarding Service continuity: Service continuity is limited in MBSFN to the MBSFN service area. To keep the service continuity in SC-PTM the UE is allowed to switch to unicast in a case of a handover and the new serving cell not transmitting a SC-PTM transmission. This feature is relevant for Mission Critical Services, where the degree of reliability of the service must be maintained.

Limitations related to UE interest indication: In order to know, from the network side, the UE interest in a specific service, UEs have to indicate such interest via an "MBMS interest indication" Radio Resource Control (RRC) message in several cases including upon successful connection establishment, upon entering or leaving the service area, upon session start or stop, upon change of interest, upon change of priority between MBMS reception and unicast reception or upon a change to a PCell broadcasting. For MBSFN, the MCE (Multi-cell/multicast Coordination Entity) can use the MBMS counting procedure to count the number of RRC_CONNECTED mode UEs which are receiving via an MRB or interested to receive via an MRB the specified MBMS services.

Limitations regarding inflexible control information acquisition: In order to save UE battery power in monitoring for the availability of an MBMS broadcast, a trigger must come from the network side to wake up the UE for MBMS reception. The control plane and the indication of control information change is shared by all MBMS services within an MBSFN area or cell. This may have negative impacts on many aspects of the system and the UE performance when multiple services with various latency requirements use MBMS in the same MBSFN area or the same cell. For example, a UE interested in an MBMS service allowing for longer latencies must monitor for the control information change more frequently than necessary resulting in battery drain. It may not be necessary to specify a specific/explicit trigger mechanism for broadcast control information acquisition in 5G but it may be sufficient to include an MBMS notification in the paging message.

NR MBS Requirements, Use Cases and Work Item Objectives

3GPP RAN has considered a number of use cases which would benefit from 5G MBS support. The use cases may be classified into four main categories:

First is media and entertainment. For example, a number of users may be interested in receiving shared virtual reality or augmented reality content.

Second is public warnings. For example, users may be notified with alerts carrying multimedia messages including the description of the type of alert and multimedia data giving instructions, advice, and additional information to users (e.g., picture of a missing child, map of last known location, instructions on what to do, etc.) This traffic is "ad-hoc" in nature as the user has not necessarily subscribed to this service Third is automotive. Various V2X applications require information delivered from the Intelligent Transport System (ITS) infrastructure (such as ITS roadside units and sensors) to the vehicle. For example: road safety, signage, mapping, autonomous driving, etc.

Fourth is IoT. In many situations we may have to send a firmware update to a large number of devices, or a new configuration to a large number of devices. The devices themselves may have reduced capability.

The requirements for these use cases in terms of bit rate, latency, user density, and reliability are rather varied, but each would benefit from a form of PTM transmission in the RAN. Based on these use cases, 3GPP has determined a number of requirements related to 5G MBS. During the scoping for Release 17, 3GPP RAN converged on a series of high-level requirements that are expected from 5G MBS. See TS 22.261, Service requirements for the 5G system, V16.11.0 and TR 38.913, Study on scenarios and requirements for next generation access technologies, V15.0.0.

These requirements include a number of features. For bit rate, this can be very high. For latency, this can be very low. For reliability, system must support use cases with extremely high reliability. For density: system should be able to deal with extremely dense deployments. For mobility, system should be able to handle high mobility UEs. In addition, the operator should be sufficiently flexible to dynamically change the capacity reserved for MBS and the size of service area. Last, regarding efficiency, the operator should be able to dynamically change how the service is provided to the UE (multicast, broadcast, unicast, PTP, PTM) as well as to allow UE to be able to receive multiple parallel services (one or more unicast services plus one or more MBS services).

As a result, a 3GPP RAN group has started a new work item that addresses some of the limitations of the MBMS operation over LTE and tries to meet the requirements listed above. See RP-201038, Work Item on NR Multicast and Broadcast Services.

The work item has two main objectives. First is to specify RAN basic functions for broadcast/multicast for UEs in RRC_CONNECTED state. The second is to specify RAN basic functions for broadcast/multicast for UEs in RRC_IDLE/RRC_INACTIVE states.

The first objective of specifying RAN basic functions for broadcast/multicast for UEs in RRC_CONNECTED state has five aspects. First is specifying a group scheduling mechanism to allow UEs to receive Broadcast/Multicast service (also including specifying the necessary enhancements that are required to enable simultaneous operation with unicast reception. Second is specifying support for dynamic change of Broadcast/Multicast service delivery between multicast (PTM) and unicast (PTP) with service continuity for a given UE. Third is specifying support for basic mobility with service continuity. Fourth is specifying required changes to improve reliability of Broadcast/Multicast service, e.g., by UL feedback. The level of reliability should be based on the requirements of the application/service provided. Fifth is studying the support for dynamic control of the Broadcast/Multicast transmission area within one gNB-DU and specify what is needed to enable it, if anything.

The second main objective of specifying RAN basic functions for broadcast/multicast for UEs in RRC_IDLE/RRC_INACTIVE states [RAN2, RAN1] encompasses specifying required changes to enable the reception of Point to Multipoint transmissions by UEs in RRC_IDLE/RRC_INACTIVE states, with the aim of keeping maximum commonality between RRC_CONNECTED state and RRC_IDLE/RRC_INACTIVE state for the configuration of PTM reception.

Note that the work item does not include any objectives related to FR2 operation, SFN operation, dynamic resource allocation of up to 100% to MBS, and Receive only-mode operation. Despite this, there is a general requirement that any design decisions taken should not prevent introducing such features or operations in future releases.

NR MBS Mobility

NR mobility is typically divided into IDLE/INACTIVE mode mobility procedures as well as CONNECTED mode procedures. See TS 38.304, User Equipment (UE) procedures in idle mode and in RRC Inactive state, V16.2.0.

IDLE/INACTIVE Mode Mobility

The basic steps for cell reselection are defined in TS 36.304, User Equipment (UE) procedures in idle mode and in RRC Inactive state. Here cell reselection is always based on Cell Defining SSB located on the synchronization raster. The UE makes measurements of attributes of the serving and neighbor cells to enable the reselection process. For the search and measurement of inter-frequency neighboring cells, only the carrier frequencies need to be indicated. Cell reselection identifies the cell that the UE should camp on. It is based on cell reselection criteria which involves measurements of the serving and neighbor cells. Intra-frequency reselection is based on ranking of cells. Inter-frequency reselection is based on absolute priorities where a UE tries to camp on the highest priority frequency available.

A Neighbor Cell List (NCL) can be provided by the serving cell to handle specific cases for intra- and inter-frequency neighboring cells. Blacklists can be provided to prevent the UE from reselecting to specific intra- and inter-frequency neighboring cells. Whitelists can be provided to request the UE to reselect to only specific intra- and inter-frequency neighboring cells. Cell reselection can be speed dependent, and service specific prioritization may be used.

Measurements may be relaxed for certain cases. For example, if the serving cell fulfils Srxlev>SIntraSearchP and Squal>SIntraSearchQ, the UE may choose not to perform intrafrequency measurements. Similarly, measurements may be relaxed for a NR inter-frequency with an equal or lower reselection priority than the reselection priority of the current NR frequency and for inter-RAT frequency with lower reselection priority than the reselection priority of the current NR frequency. Lastly, if the serving cell fulfils Srxlev>SnonIntraSearchP and Squal>SnonIntraSearchQ, the UE may choose not to perform measurements of NR inter-frequencies or inter-RAT frequency cells of equal or lower priority.

CONNECTED Mode Mobility

Figure 1B:
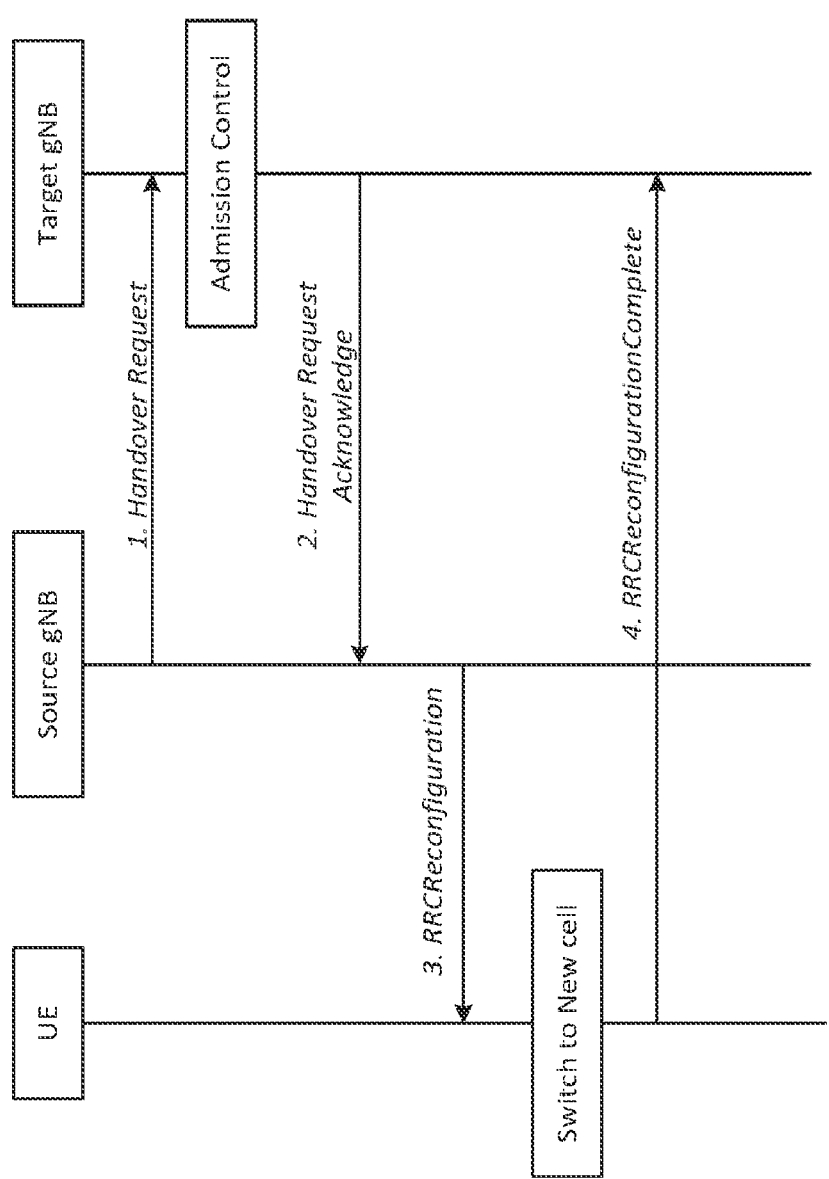
FIG. 1B is a call flow diagram of an example of NR handover procedure.

The basic steps for handover are shown in FIG. 1B and described in TS 36.304. In step 1, a UE is configured for taking measurements. In step 2, based on certain events, the UE reports these measurements to the source gNB. These events can be periodic, or event driven, for example.

In step 3, the source gNB decides whether to handover to another cell or not—it uses the UE measurements as well as other information it may have available (such as load).

In step 4, the source gNB sends Handover Request to target gNB, which performs admission control for the UE. In step 5, the RRC configuration for the target cell is provided in the Handover Request Ack and forwarded to the UE. In step 6, the UE disconnects from source gNB. In step 7, the UE switches to new cell and reconfigures its access stratum to match the new configuration provided by the target cell. In step 8, the UE sends an RRC reconfiguration complete message to the target gNB.

Additional steps (not shown) may be taken between the source gNB, target gNB, and 5GC entities to ensure lossless transmission to/from the UE.

Note that there is a possible interruption time, between step 6 and step 7, while the UE waits to send the reconfiguration complete message to the target gNB. During this time, the UE cannot receive any DL transmissions, and is not able to send any UL transmission to the network. This interruption time is a serious issue for many use cases that require service continuity, and in Rel16, there was an attempt to reduce this time to Oms, by introducing Dual Active Protocol Stack (DAPS). Basically, DAPS is a version of enhanced make-before-break handover. The UE is allowed to maintain 2 parallel protocol stacks (one to the target cell and one to the source cell). The parallel stacks allow the UE to simultaneously communicate with both cells during the interruption time, thereby maintaining service continuity.

eMBMS Service Continuity

Initial releases of eMBMS assumed that MBMS features did not affect mobility procedures in E-UTRA. Thus, some UEs that are receiving or interested in MBMS services may be unable to receive MBMS services due to cell reselection in RRC_IDLE or handover in RRC_CONNECTED. See TS 36.304.

For example, when a UE in RRC_IDLE is receiving an MBMS service at one carrier frequency, the UE in RRC_IDLE may reselect to another carrier frequency where no MBMS is supported, for example, due to cell reselection priorities. In addition, when a UE in RRC_CONNECTED is receiving an MBMS service at one cell, the eNB may move the UE to another cell (via the handover procedure) where no MBMS is supported, because the eNB does not know whether or not the UE is receiving MBMS services. Accordingly, some UEs may not continue to receive MBMS services.

It would be possible for UEs supporting MBMS to avoid such interruption of MBMS reception with dual receivers. For instance, if a UE had dual receivers, the UE could use one receiver to receive unicast services such as voice calls and an Internet service from a serving cell selected based on normal mobility procedures, and the other receiver to receive MBMS services from a cell supporting MBMS. However, one drawback of dual receivers is increased complexity in terminals supporting the MBMS. Thus, if possible, it is desirable for the UE to receive both unicast services and MBMS services on the same carrier frequency by using a single receiver.

In Release 11, 3GPP further enhanced the MBMS with support for MBMS service continuity. For this purpose, the network can provide assistance information to inform UEs about mapping information between carrier frequencies and MBMS services, and transmission timing of MBMS services.

By using the assistance information, when the UE is interested in a particular MBMS service, the UE in RRC_IDLE can autonomously set the carrier frequency carrying the MBMS service to the highest cell reselection priority for the scheduled time. As a result, it is likely that the UE will reselect to a cell on the carrier frequency carrying the MBMS service.

It should be noted that UEs in RRC_IDLE are allowed to set autonomously the highest cell reselection priority for MBMS not only from Release 11 but also from Release 9. However, UEs in Releases 9 and 10 are not provided with the assistance information of Release 11. Hence, those UEs can do so only when they have knowledge of mapping information between carrier frequencies and MBMS services, for example, via application layers.

In Release 11, while the UE is in RRC_CONNECTED, the UE can inform the serving cell about carrier frequencies where MBMS services of interest are scheduled to be transmitted. For this purpose, the RRC layer introduced a new uplink message called the MBMSInterestIndication message.

When a UE is receiving or is interested in MBMS services, a UE in RRC_CONNECTED can send an MBMSInterestIndication message including one or more carrier frequencies where the MBMS services are scheduled. Then, when the eNB receives the MBMSInterestIndication message from the UE, it is likely that the eNB will move the UE to a cell on the carrier frequency carrying the MBMS service by initiating handover.

Note that in eUTRAN the MBMS only supports broadcast mode (from the viewpoint of the core network). As a result, the network has no knowledge of the UEs that are receiving or interested in receiving a service. The method selected to provide this information to the RAN node was through an RRC message.

Figure 2:
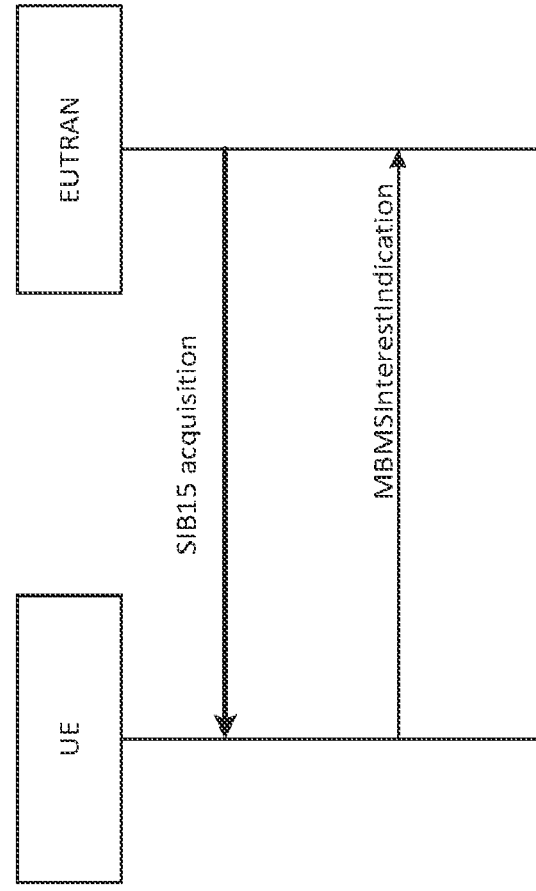
FIG. 2 is a call flow diagram of an example of MBMS interest indication.

FIG. 2 illustrates an MBMS Interest Indication.

Example Challenges

The first two releases of 5G RAN do not support MBS. Release 15 and Release 16 design decisions were made to support only unicast services over the Uu interface. Based on the Release 16 5G design, the 5G MBS requirements, and the LTE MBMS limitations, a number of problems need to be resolved in order to allow 5G MBS mobility and service continuity.

Figure 3:
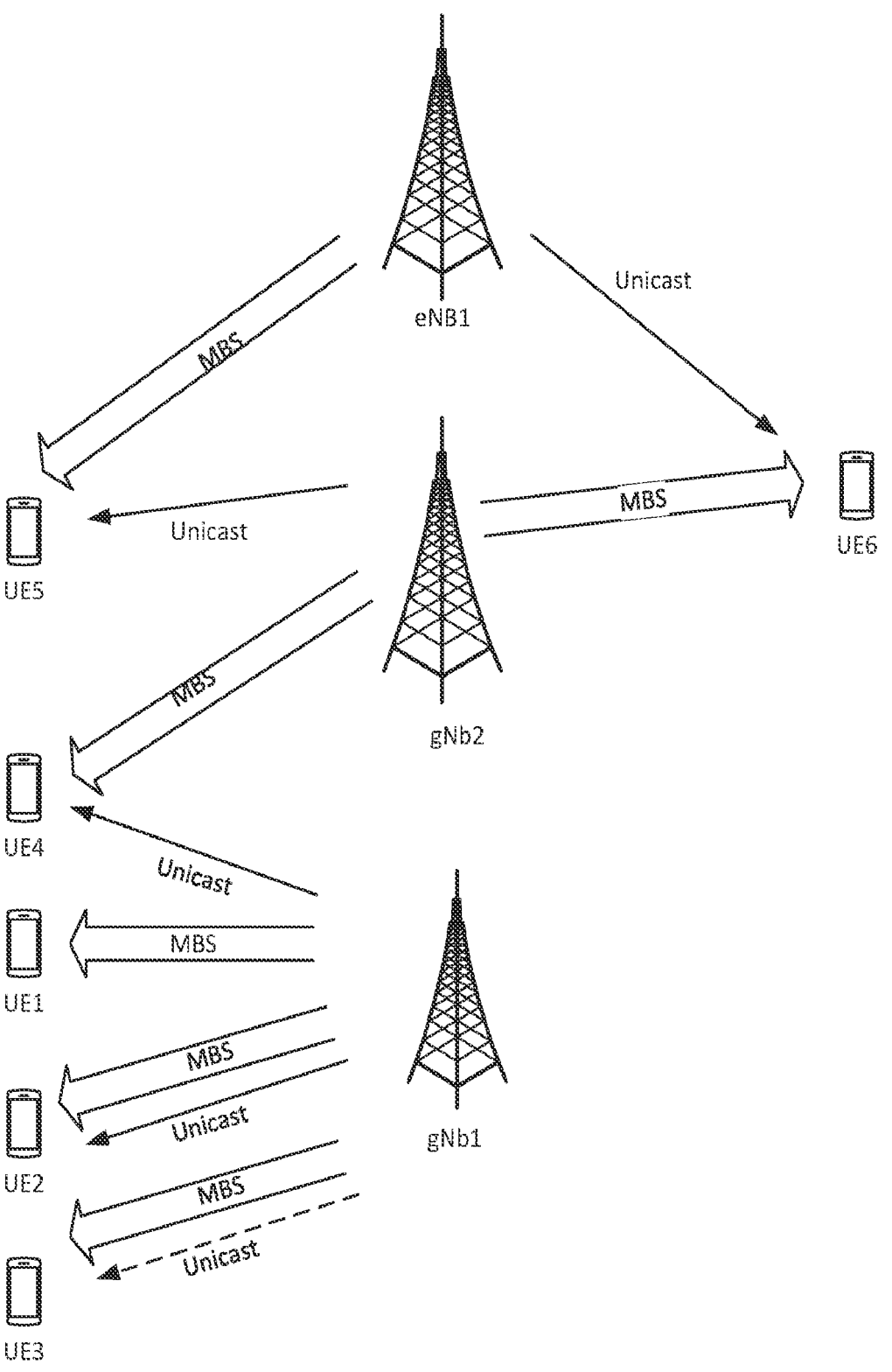
FIG. 3 is a block diagram of an example of MBS reception alternatives.

FIG. 3 shows a high-level overview of the various MBS reception alternatives that are considered. In the example of FIG. 3, UE1 receives only multicast/broadcast service in NR cell. UE2 receives unicast service and multicast/broadcast service from the same NR cell—services offered in same BWP. UE3 receives unicast service and multicast/broadcast service from the same NR cell—services offered in different BWP. UE4 receives unicast service and multicast/broadcast service from different NR cell. UE5 receives unicast service from NR cell and multicast/broadcast service from a legacy LTE cell. UE6 receives unicast service from LTE cell and multicast/broadcast service from a NR cell.

In order to support mobility and service continuity for these different alternatives, the UE and the network may need to adhere to a number of procedures.

First is providing control information to UEs so that the UEs know what reception options are available to it, and how to receive the MBS transmissions (e.g., System information).

Second, UE assistance to the network so the network can determine how best to offer the MBS service to the UE and to support mobility and service continuity (UE capability exchange & MBS Interest Indication exchange.)

Figure 4:
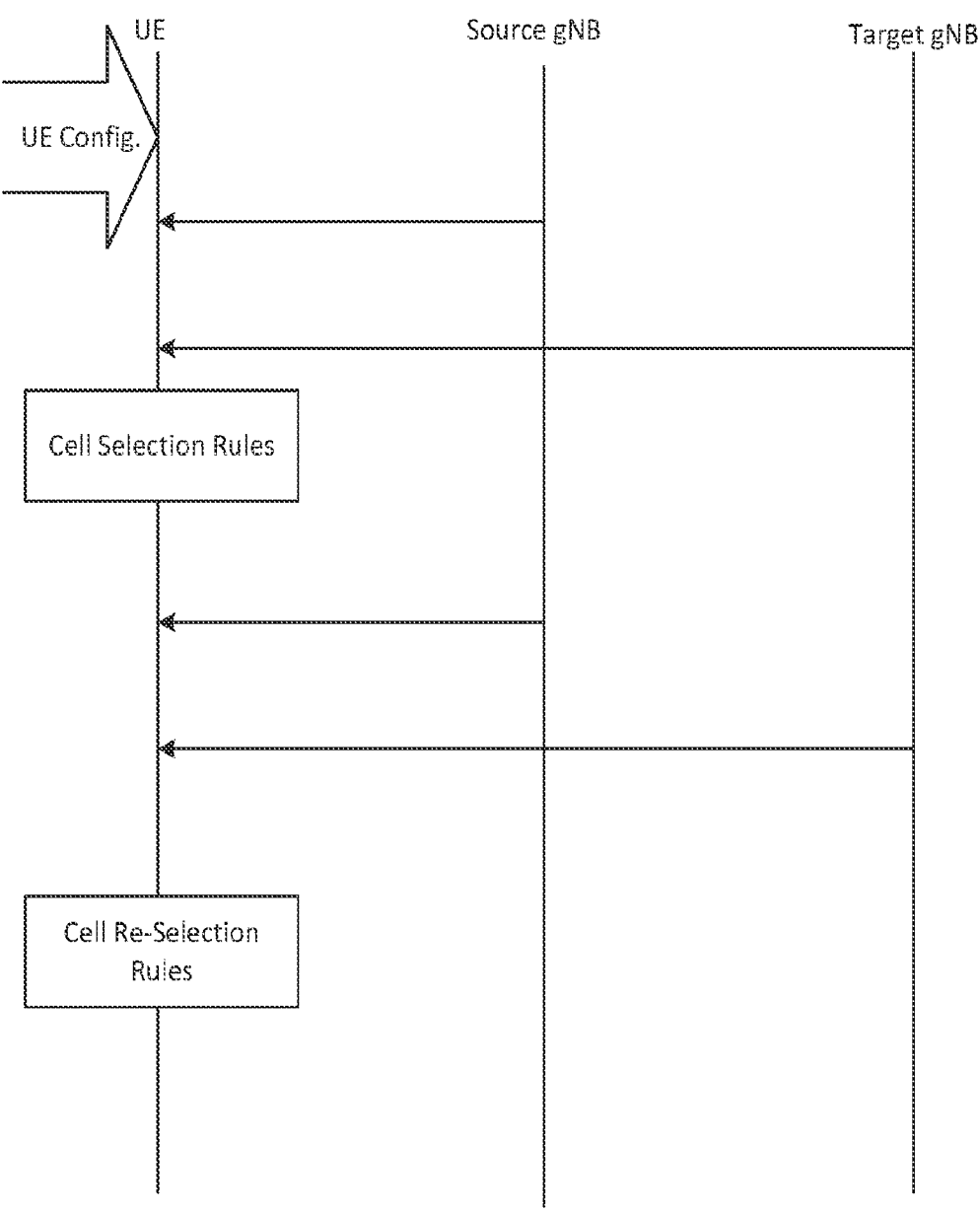
FIG. 4 is a call flow diagram of an example of cell selection and cell reselection.

Third, cell selection procedures allow the Idle mode UEs to select the best cell for MBS reception. This procedure involves two main sub-tasks: UE measurement configuration and UE cell selection rules (See FIG. 4).

Fourth cell reselection procedures to allow the Idle/Inactive mode UEs to reselect the best cell for MBS reception as conditions change. This procedure involves two main sub-tasks: UE measurement configuration and UE cell reselection rules (See FIG. 4).

Fifth, MBS configuration procedures allow the Connected mode UEs using the first RAT to operate MBS over a second RAT (specifically for UE5 and UE6)

Figure 5:
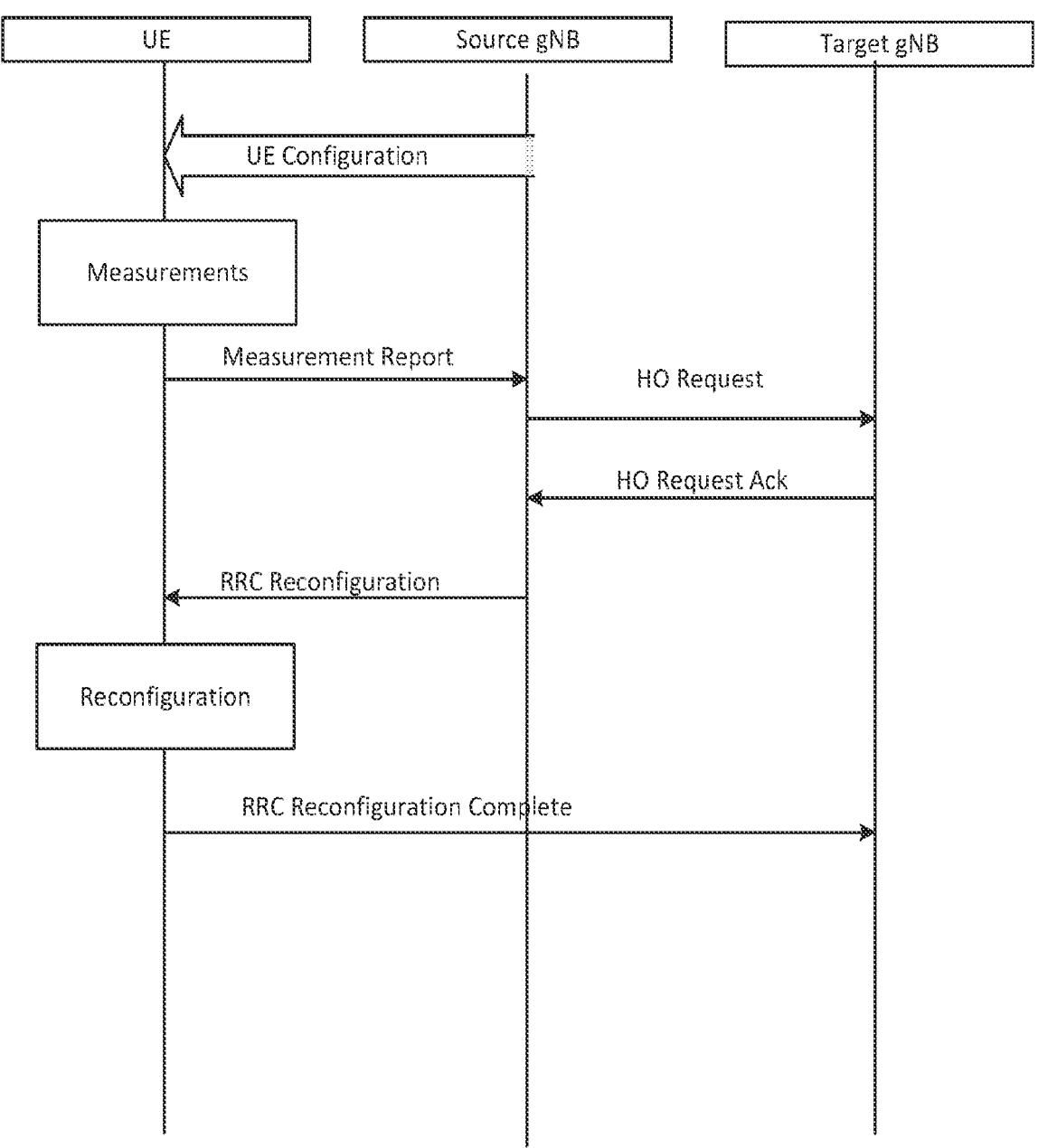
FIG. 5 is a call flow diagram of an example of handover.

Sixth, handover procedures to allow the Connected mode UE to be handed over to neighbor cells as conditions change. This procedure involves three main sub-tasks: UE configuration, UE measurements and measurement reporting, and handover reconfiguration procedure (See FIG. 5).

Each of these procedures will need to be enhanced/modified to support the mobility and service continuity for 5G MBS for the MBS reception alternatives described earlier herein.

Problem 1: —MBS Assistance Related Issues

The UE needs to be aware of the MBS reception options that are available to it in the serving cell. For LTE, the system information may include items described in TS 36.304, such as the MBMS Service Area Identities (MBMS-SAI) of the current cell and the neighbor LTE carrier frequencies, as well as the MBMS Service Area Identities (SAI)s on these neighbor carrier frequencies.

System information for NR may include the neighbor LTE carrier frequencies as well as the MBMS Service Area Identities (SAI)s on these neighbor carrier frequencies in order to support UEs of type UE5. See R2-2004535, Mechanisms to enable simultaneous operation of NR Unicast+LTE MBMS, Qualcomm Incorporated, FirstNet, AT&T, Telstra, Academy of Broadcasting Science, Shanghai Jiao Tong University, British Broadcasting Corporation, European Broadcasting Union, Institut für Rundfunktechnik.

Here, three issues need to be addressed. First, 5G MBS is expected to be much more flexible and dynamic than eMBMS—dynamic transmission areas, dynamic resource allocation, etc. In order to support mobility and service continuity in 5G MBS, the UE will need to obtain additional MBS reception options through system information. For example, whether the service is active in a cell, how the service is offered in a cell, whether the service is active in a neighbor cell, how the service is offered in a neighbor cell, the MBS BWP of the service, etc.

Second is how this 5G MBS system information is obtained also needs to be determined. Will this information be delivered through an on-demand mechanism or will it be periodically broadcast?

Third, based on the MBS assistance information, what actions will the UE take autonomously to ensure service continuity? For example, triggering a PTM to PTP switch before a handover, triggering the target cell to alter how the MBS service is offered (or to start offering the service).

Problem 2: UE Assistance Information Issues

In LTE, the MBMS Interest Indication is used to tell the network the MBMS services that the UE is receiving or interested in receiving. It is used mostly for service continuity as LTE only supports broadcast mode, and as a result the network has no idea about the MBMS services the UE is receiving or interested in receiving. See TS 36.331, Evolved Universal Terrestrial Radio Access (E-UTRA); Radio Resource Control (RRC); Protocol specification, V16.2.0. There is a discussion as to whether such a mechanism will be needed for 5G MBS. There are clearly use cases where such information will be needed: for broadcast mode MBS services, for cases where UE receives legacy MBMS services on an LTE carrier, etc.

Here a number of issues need to be addressed. What is included in the UE Assistance Information? When does the UE transmit the UE Assistance Information? How does the network use the UE Assistance Information?

Problem 3: Issues Related to UE Measurements & Measurement Reporting

For each of the MBS reception alternatives, a UE with an ongoing MBS service may require different UE measurements to support MBS mobility. The measurement rules for cell reselection may also be different for UEs with ongoing MBS services. For Connected Mode, the UE may require new events to reflect the ongoing MBS services. The UE may need measurement gaps for cases where the MBS reception is over a cell other than the serving cell. How will the UE deal with measurements in the case that the unicast and multicast/broadcast services are over different BWPs.

Problem 4: Idle/Inactive Mode Cell Selection/Reselection Rules

For each of the MBS reception alternatives, a UE with an ongoing MBS service may require different cell selection and cell reselection rules. For example, the cell ranking may not only be based on cell quality. Another issue to address is how to deal with the "progress gap" problem where the progress of the MBS transmission in the source cell and the target cell is not aligned. See R2-2007414, Discussion on MBS mobility with service continuity, CMCC. Solutions need to also consider that the MBS services will likely be deployed on the granularity of a cell (and not a frequency layer as in LTE). As a result, in LTE, all cells of a given frequency are expected to support the MBS service. There will be no coverage holes. In 5G MBS, the transmission area is expected to be very dynamic. Some cells on a given frequency will support MBS, while neighboring cells may not support the MBS service—leading to MBS coverage holes in a given area.

Problem 5: Connected Mode Handover

For each of the MBS reception alternatives, a UE with an ongoing MBS service may require an enhanced handover procedure to reduce the interruption time. For example, the network may allow cast specific handovers. A UE may have DRBs and MRBs, and only one of these is handed over to a target cell—the other remaining in the source cell. The UE may maintain connection to both cells. In such cases, the UE operation in this mode would need to be defined. Another issue to address is how to deal with the "progress gap" problem where the progress of the MBS transmission in the source cell and the target cell is not aligned. See R2-2007414, Discussion on MBS mobility with service continuity, CMCC. Solutions need to also consider that the MBS services will likely be deployed on the granularity of a cell (and not a frequency layer as in LTE). As a result, it is possible to have MBS coverage holes in a given area.

Example Solutions

Hereinafter the terms IDLE mode, Idle mode, and RRC_Idle mode are used interchangeably. Hereinafter the terms INACTIVE mode, Inactive mode, and RRC_Inactive mode are used interchangeably. Hereinafter the terms CON-NECTED mode, Connected mode, and RRC_Connected mode are used interchangeably. The terms "mode" and "state" are also used interchangeably.

Example Solutions to Problem 1: MBS Assistance Information

To address MBS assistance related issues, based on the unique characteristics of NR as well as the requirement for service continuity, the network may provide a number of items of assistance information. For example, a gNB may provide one or more items of serving cell information related to MBS operations, such as whether the gNB is MBS capable, active MBS services in the cell, and potentially active MBS services in the cell. For each MBS service, the gNB may provide the scheduling of the service. For each potentially active MBS service, an indication if UE can trigger the gNB to start an MBS service for a cell.

For each MBS service, the gNB may provide the BWP over which the service is carried and how the service is offered in the cell (PTP, dedicated PTM, shared PTM, split bearer with PTP leg and PTM leg).

Similarly, neighbor cell information may be provided. It is likely that 5G MBS will operate at the granularity of a cell. In such cases, UE mobility may result in a UE moving/transitioning to a cell that either does not support MBS, does not support the MBS service, or is not currently providing the MBS service.

In such a case, the gNB may provide MBS assistance to the UE including one or more of the following. First is a list of neighbor cells that are providing the service. This may include the physical cell ID as well as the frequency and/or BWP on which the service is provided. Second, the gNB may provide a list of neighbor cells that may be able to provide the service (they can initiate the MBS session). This may include the physical cell ID as well as the frequency and/or BWP on which the service may be provided.

Third is a list of neighbor cells that are unable to provide the service, and fourth is a list of frequencies where the service is provided—not all cells on that frequency may provide the service.

For each neighbor cell, the UE may provide an indication of how the MBS service is offered in the cell (PTP, dedicated PTM, shared PTM, split bearer with PTP leg and PTM leg). Similarly, for each neighbor cell, the gNB may provide: a BWP that carries the MBS service. Further, for each neigh-bor cell, the gNB may provide an indication of whether: the neighbor cell transmission progress is aligned; the UE can trigger the starting of the MBS service; and/or the neighbor cell may be used as a secondary MBS cell.

For each neighbor cell, the UE may provide an indication of additional MBS and/or eMBMS services provided in the cell.

MBS assistance information may be provided through a combination of system information, control signaling, and dedicated signaling. The information provided through sys-tem information may be transmitted through on demand or aperiodic mechanism or transmitted periodically. Some information may be provided through both mechanisms. For example, the neighbor cell information may be provided both through dedicated control signaling or through system information. The former used by UEs that do not have an ongoing MBS session, while the latter used by UEs that may already have an ongoing MBS session.

Based on the received MBS assistance information, the UE may, for example, send an RRC message to the gNB, to request the gNB to start an MBS service or have the gNB request that a neighbor cell start an MBS service. The UE may send a UEAssistanceInformation message to the gNB to request a change on how the UE is receiving the service (e.g., from PTP to PTM). The UE may autonomously start receiving the MBS service using a shared PTM configura-tion. Before reselecting a cell that does not support MBS service, UE may trigger transition to connected mode to guarantee service continuity.

Example Solutions for UE Assistance Information

UE assistance information may be provided through a UEAssistanceInformation message, through a UECapabili-tyInformation message, or through a new MBSInterestIndi-cation message. The following six items may be included in the UE assistance information, for example.

First is a list of MBS services the UE is interested in. For each service, the UE may include a list of cells that support this service, a frequency over which the service is available, the bandwidth part over which the service is available, the RAT over which the service is available, etc.

Second is a list of MBS services the UE is currently receiving. For each service, the UE may include the band-width part carrying the service, the priority of the service, the scheduling of the service, how the UE is receiving the service (PTP, shared PTM radio bearer, dedicated PTM radio bearer), etc.

Third is an indication of whether the UE allows simulta-neous reception of MBS services over two cells.

Fourth is an indication of whether UE wants strict service continuity, whether it can tolerate a small QoS degradation at handover, whether it wants to move service to PTP if PTM continuity is not possible. Fifth is an indication of whether, at handover, the UE would prefer to retain its MBS radio bearer in the source cell. Sixth is an indication of how, at handover, the UE would prefer to handle transmission progress gap issues.

The UE may transmit this UE assistance information, for example, periodically, upon request from the network, or upon a change in the list of MBS services the UE is interested in or list of MBS services the UE is receiving. Similarly, the UE may transmit the assistance information upon UE capability change or cell selection or reselection. The UE may transmit the assistance information based on a desire to change how MBS service is being received. For example, the UE may want to change reception from dedi-cated PTM to shared PTM, for example to save power.

Example Solutions for UE Measurements & Measurement Reporting

UE measurements and measurement reporting may be addressed in a number of ways. In Idle mode and Inactive mode, mobility decisions are performed at the UEs. These decisions however may be influenced by certain configura-tion parameters received from the gNB. The UE takes measurements to determine the quality (based on RSRP or RSRQ) of the serving cell, the intra-frequency neighbor cells, inter-frequency neighbor cells, and the inter-RAT neighbor cells.

The resulting Release 16 measurement rules imply that if there is a frequency of higher priority than the current serving frequency, the UE must always take measurements on those frequencies. See TS 38.304. If there is a frequency of equal or lower priority (or if there is no priority in the frequencies) the UE may choose not to perform measurements on those frequencies.

When a UE has an ongoing MBS service on a frequency f1, these measurement rules may be further enhanced to save UE power. It is proposed that for the frequencies of equal or lower priority than the serving cell frequency (or in the case there is no priority), the UE may choose not to perform intrafrequency measurements and/or interfrequency measurements or choose not to perform intrafrequency measurements and/or interfrequency measurements as long as the UE is satisfied with the MBS service.

UE may choose not to perform intrafrequency measurements and/or interfrequency measurements if the quality of the serving cell is acceptable. The UE may use different thresholds: SMBSIntraSearchP, SMBSIntraSearchQ, SMB SnonIntraSearchP, SMBSnonIntraSearchQ or scaled versions of the existing threshold: SIntraSearchP, SIntraSearchQ, SnonIntraSearchP, SnonIntraSearchQ which are scaled by a configurable parameter MBS_Meas_scaling. This factor and the new threshold parameters may be included in the system information Further it is proposed that when a UE has an ongoing MBS service on a frequency f1, that for frequencies of higher priority, if the higher priority frequency does not support the MB S service or if the UE is not aware if the higher priority frequency supports the MBS service, the UE may choose not to perform interfrequency measurements. If the higher priority frequency does not support the MBS service or if the UE is not aware if the higher priority frequency supports the MBS service, the UE may choose not to perform interfrequency measurements as long as the UE is satisfied with the MBS service. If the higher priority frequency does not support the MBS service or if the UE is not aware if the higher priority frequency supports the MBS service, the UE may choose not to perform interfrequency measurements if the quality of the serving cell is acceptable. The UE may use new thresholds: SMBSnonIntraSearchP, SMBSnonIntraSearchQ. These new threshold parameters may be included in the system information In Connected Mode, the network configures measurements in the UE. This provides information related to the measurement objects (what to measure) and the reporting configurations for these measurement objects. It is proposed that the network defines new measurement objects that reflect the received MBS quality. For example, this quality may be based on measurements to Reference Signals carried in the MBS transmissions or on some HARQ statistics (for instance number of NACKs, ACK/NACK ratio, etc. over a window). The UE could be configured with the measurement object and new monitoring events specifically for MBS may be defined. For example, a new event M1 may be defined which is triggered when the MBS quality in serving cell is below a configured threshold. As another example, a new event M2 may be defined which is triggered when the MBS quality in serving cell is above a configured threshold. Upon reception of the measurement report, the gNB may use this information to help maintain the MBS service continuity for this UE. The gNB has a number of options. First, the gNB may reconfigure the multicast radio bearer to help this UE—this may also help other UEs. For example, the gNB may: use a more robust modulation and coding scheme for the MBS transmissions; increase the transmission power for the MBS transmission; increase the number of HARQ retransmissions; use blind retransmissions, etc. Second, the gNB may move the MBS transmission for this UE to a dedicated PTP radio bearer. Third, if available, the gNB may determine that the UE would be better served by a neighbor cell and it may handover the UE to the neighbor cell.

Figure 6:
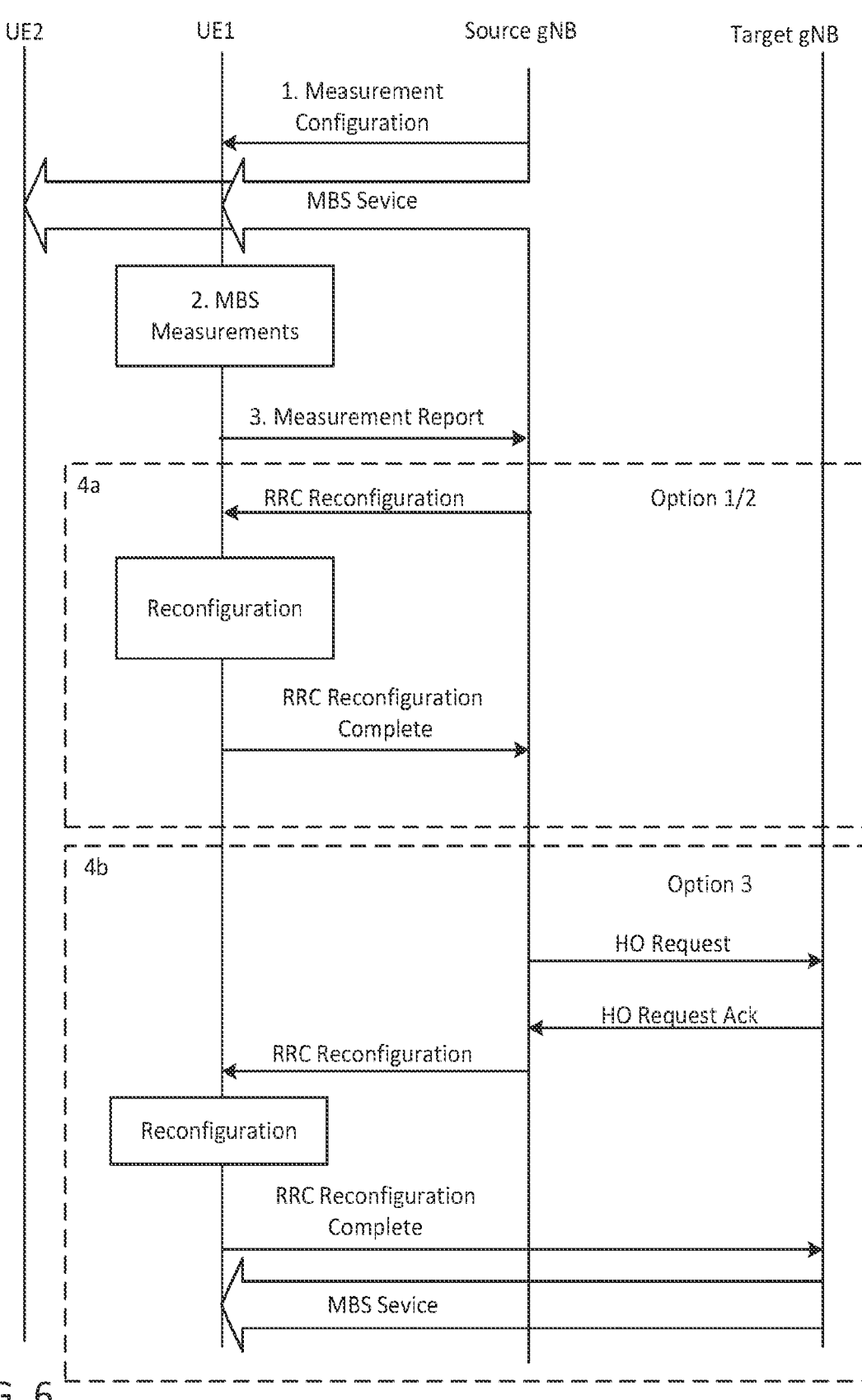
FIG. 6 is a call flow diagram of an example of new measurement reporting.

The overall procedure is shown in FIG. 6. In Step 0 of FIG. 6, an MBS service is offered in a source cell. In Step 1, UE1 gets the MBS measurement configuration. In Step 2, UE1 performs the configured measurements. In Step 3, UE1 is triggered to send a measurement report (say for event M1). In Step 4a, UE1 is reconfigured for the MBS service (either a modified PTM bearer or a dedicated PTP bearer). In Step 4b, the source gNB decides to handover UE1 to another cell. UE1 is reconfigured for MBS service in target cell.

Solutions for Idle/Inactive Mode Cell Selection/Reselection Rules

Cell Reselection Issue for Idle/Inactive Mode

UE uses the cell reselection evaluation process to reselect to a new cell. In LTE, eMBMS services are provided on a frequency layer basis. In 5G MBS, the MBS deployment will likely be at the granularity of a cell, and so not all cells of a frequency will offer the MBS service. In such a case, the cell reselection rules may need to be modified.

Note that in the following, it is assumed that the cells providing the MBS service do so via a shared PTM radio bearer. Hereinafter, a cell not providing MBS service may mean a number of things. First, it may mean that the cell is from a gNB that is not MBS capable, i.e., the cell cannot provide the MBS service. Second, it may be that cell is from a gNB that is MBS capable, but the cell is not capable of providing the MB S service. For example, the cell may be operating over a frequency which the MBS service is not offered, and so this cell cannot provide the MBS service. Third, it may be that the cell is from a gNB that is MBS capable, but the cell is not currently offering this service. This cell may provide the MBS service in the future.

Figure 7:
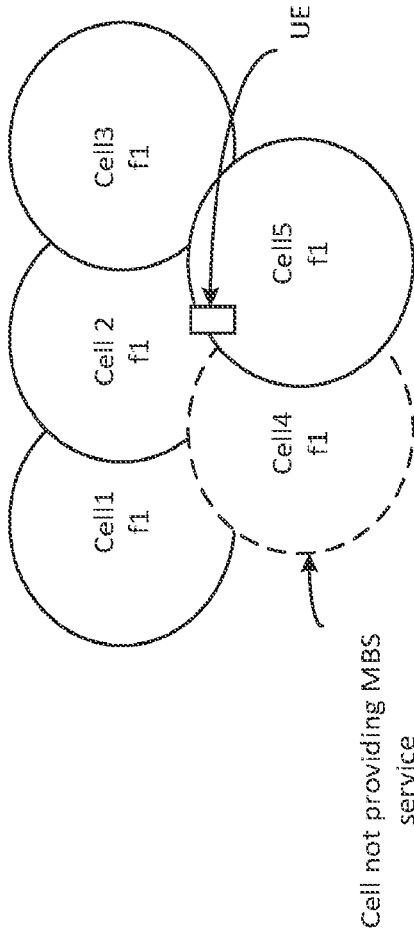
FIG. 7 is a block diagram of an example of intra-frequency cell reselection case.

In the intra-frequency case FIG. 7, UE is using or interested in using an MBS service and all cells are on the same frequency (there are no inter-RAT or inter-frequency cells). The UE is currently camped on cell 5. To maintain service continuity, two options are proposed. First, the UE may continue with the Release 16 cell ranking looking for the best cell in terms of signal quality. See TS 38.304.

If the UE ranks Cell 4 as the best, this cell does not provide the MBS service. The UE may transition to Connected mode while on cell 5, and request that Cell 4 offer the service.

Second, the UE may modify the ranking procedure so that the cells that cannot provide the MBS service are not as highly ranked (or de-prioritized). For example, the UE may add an offset to the cell-ranking criterion Rs for serving cell (QoffsetMBS1) and/or criterion Rn for neighboring cells (QoffsetMBS2), e.g., wherein:

$$Rs = Q\text{meas},s + Q\text{hyst} - Q\text{offsettemp} + Q\text{offsetMBS1}$$

$$Rn = Q\text{meas},n - Q\text{offset} - Q\text{offsettemp} - Q\text{offsetMBS2}$$

These offsets may be included as part of the system information. Alternatively, these offsets may be provided through (pre)configuration. The UE may autonomously decide to use these offsets in the ranking based on the priority of the MBS traffic. The UE may furthermore modify the ranking procedure so that the cells that are not currently offering the MBS service, but that may provide the MBS service, are not as highly ranked (or de-prioritized). The prioritization may be, for example: first, cells that are currently providing the desired MBS service; second, cells that are not currently providing the MBS service, but may provide the service; and third cells that cannot provide the MBS service.

The UE may decide to not include in the cell ranking, those cells that cannot provide the MBS service. Thereby, the UE always camps on cells that have the MBS service ongoing or cells for which the UE may trigger the gNB to start offering the MBS service. Alternatively, the UE may decide to not include in the cell ranking, those cells that cannot provide the MBS service as well as those cells that are not providing the service but may provide the service. Thereby, the UE always camps on cells that have the MBS service ongoing.

For the latter two options, the UE will favor cells that support MBS, over cells that provide better signal quality. As a result, these UEs may have issues with reception of paging, reception of system information, and with connection establishment. Transmission to and from the UE during connection establishment, may cause unnecessary uplink and downlink interference on the cells that do not provide the MBS service. It is proposed that the UE may do a Release 16 cell reselection [4] just before initiating the connection establishment exchange. This would allow the UE to camp on the better cell in terms of signal quality, at the expense of MBS reception.

The UE may further have a priority for the MBS service which may be used to help the UE determine if it should prioritize MBS operation over unicast operation in Idle/ Inactive mode. The prioritization rule may be an absolute priority. The UE may prioritize MBS cell reselection if priorityMBS>priorityUnicast or prioritize unicast cell reselection if priorityUnicast>priorityMBS.

The prioritization rule may be relative priority based on configured thresholds. For example, the UE may prioritize MBS cell reselection if priorityMBS>MBSthreshold, prioritize unicast cell reselection if priorityUnicast>Unicastthreshold, or prioritize MBS cell reselection if priorityUnicast<Unicastthreshold & priorityMBS>MBSthreshold.

Alternatively, the decision may be tied to a combination of absolute and relative priority. For example, the UE may prioritize MBS cell reselection if priorityMBS>MBSthreshold & priorityMBS>priorityUnicast. Alternatively, it may prioritize MBS cell reselection if priorityUnicast<Unicastthreshold & priorityMBS>priorityUnicast.

Note that the above description assumes that the higher the priority value, the higher is the priority of that cell reselection procedure (and traffic). Alternatively, this could be the opposite, with the lower priority value used to indicate the higher the priority of that cell reselection procedure (and traffic).

Figure 8:
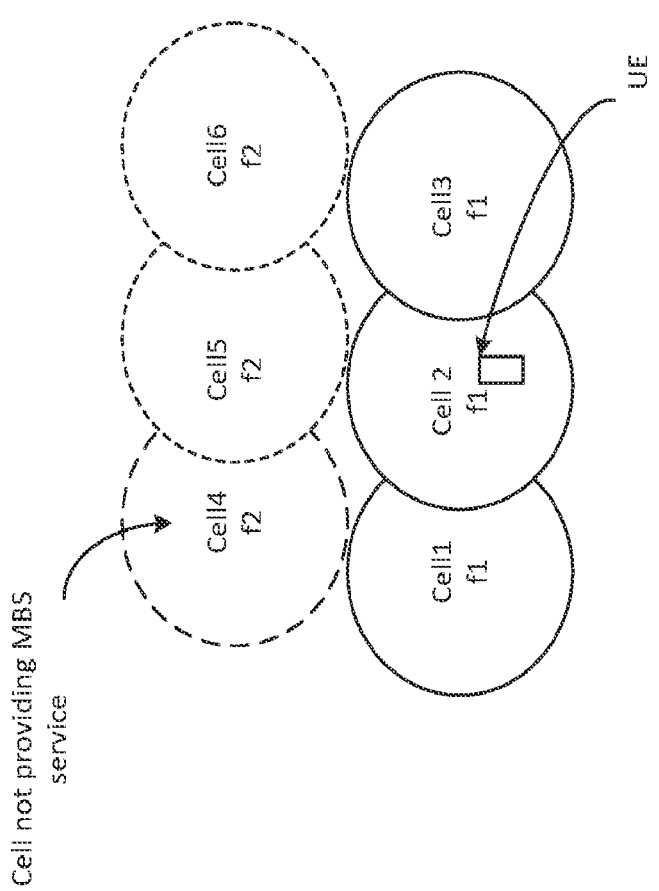
FIG. 8 is a block diagram of an example of inter-frequency cell reselection case.

In the inter-frequency case FIG. 8, UE is interested in using an MBS service and this service is provided by a neighbor frequency (although not all cells on that frequency provide the service). The UE may continue with the Release 16 cell reselection rules and it may consider frequency f2 as the highest priority. However, all cells have an associated offset (ThreshX,Offset) for reselection so that the UE favors those cells providing the MBS service (for example cell 5 and Cell 6). For the example shown, Cell 4 does not provide the MBS service and would have a high offset. As a result, Cell 4 (on the higher priority frequency) will not pass the signal quality test for reselection, where:

$$Srxlev > ThreshX, HighP + ThreshX, OffsetP \text{ or}$$

$$Squal > ThreshXHighQ + ThreshX, OffsetQ$$

Note that a separate offset may be used for cells that cannot provide the MBS service and for cells that may provide the MBS service but not currently offering this service.

As a further enhancement to the cell reselection procedure, it is proposed that after a cell reselection decision, the UE will wait until after any ongoing MBS reception for the source cell is finished, before camping on the reselected cell. This allows a UE to finish any ongoing MBS reception.

For example, in FIG. 9, the cell reselection decision occurs during the MBS reception window (the period of time during which the UE expects to receive MBS transmission). The MBS reception window may be determined from the system information where the scheduling for the MBS services is defined. If cell reselection evaluation process determines that a new cell should be re-selected, the UE may delay the cell reselection until after the MBS reception window. Similarly, if the cell reselection evaluation process determines that a new cell should be reselected but that an MBS reception windows starts within X msec, the UE may also delay cell reselection until after the MBS reception window. Both conditions may be for all cell reselections or alternatively they may be only for cell reselections to cells that do not provide the MBS service. Note that the value of X may be (pre)configured or provided through system information. Furthermore, there may be a maximum delay (Max_Delay) for the UE to perform the cell reselection. The UE will delay cell reselection up until the configured Max_Delay.

Progress Gap Issue for Idle/Inactive Mode

It is assumed that all cells supporting MBS in Idle/ Inactive mode, do so through a shared PTM radio bearer. As the scheduling of these bearers in each cell is independent, it is likely that the MBS transmissions for a given MBS session are not progress aligned. So, for example, one cell may be transmitting MBS PDU 10, 11, 12, while the neighbor cell will transmit these at a later time (neighbor cell is behind) or may have already transmitted these (neighbor cell is ahead.)

For the case where the neighbor cell is behind, cell reselection to this neighbor cell will result in the UE receiving some duplicate MBS PDUs. Although this may be resolved at the application layer, access stratum solutions are also possible. Three options are available.

First, all cells may use the same mapping of MBS PDU to PDCP SN. As a result, PDCP PDU SN x will correspond to the same MBS PDU in each of the cells. At cell reselection, the UE camps on a new cell. If the PDCP in the source cell is maintained in the reselected cell, the UE may use the PDCP PDU SN to detect duplicate MBS PDUs and discard these. If the PDCP is re-established in the re-selected cell, then it is proposed that the UE keep track of the last received PDCP PDU SN in the source cell. It may then detect if a PDCP PDU received in the reselected cell is a duplicate by comparing the PDCP PDU SN to the saved value from the source cell.

Second, UE may be arranged to know how each cell maps the MBS PDU to PDCP SN (or know the offset of this mapping between cells)

Third, the case may be limited by prioritizing cell reselection to neighbor cells that are progress aligned to the current serving cell.

For the case where the neighbor cell is ahead, cell reselection to this neighbor cell will result in lost/missing MBS PDUs. This may be unavoidable and may mean that services requiring high/strict reliability will not be transmitted using the shared PTM radio bearer.

If such services are carried in Idle/Inactive mode, the UE may use a mechanism to detect the missing PDUs whereby all cells use the same mapping of MBS PDU to PDCP SN. As a result, PDCP PDU SN x will correspond to the same MBS PDU in each of the cells. At cell reselection, the UE camps on a new cell. If the PDCP in the source cell is maintained in the reselected cell, the UE may use the PDCP PDU SN to detect missing MBS PDUs. If the PDCP is re-established in the re-selected cell, then it is proposed that the UE keep track of the last received PDCP PDU SN in the source cell. It may then detect if a PDCP PDU is missing/lost by comparing the PDCP PDU SN to the saved value from the source cell. Alternatively, the UE may be arranged to know how each cell maps the MBS PDU to PDCP SN or know the offset of this mapping between cells.

Once the missing PDUs are detected, the UE may notify upper layers (e.g., an application layer) that some PDUs have been lost, and m. Move to connected mode and request the missing PDUs.

Example Solutions to Problem 5: Connected Mode Handover

Enhanced Handover Procedure

Figure 10A:
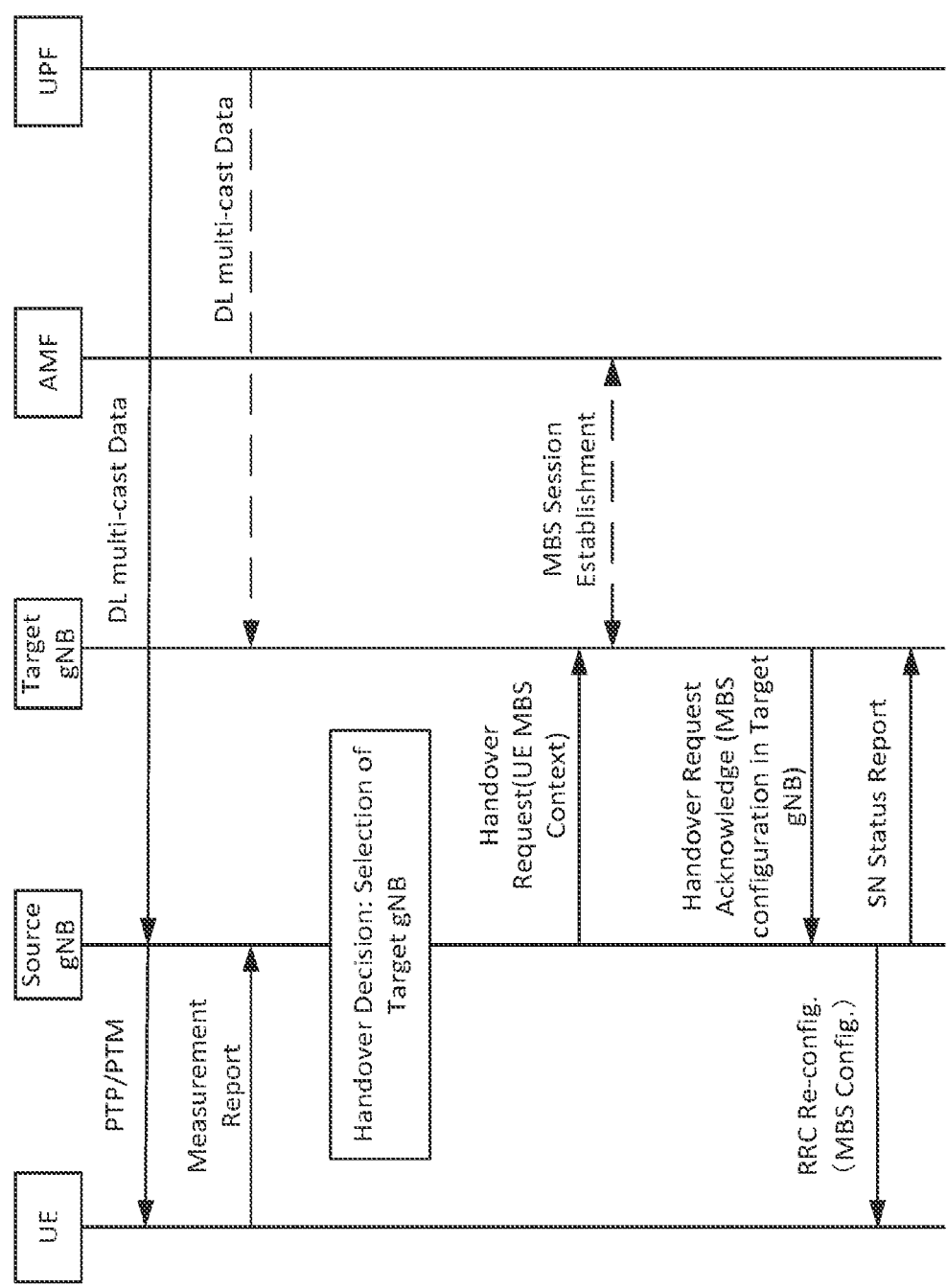
FIGS. 10A and 10B show a call flow diagram of an example of baseline inter-gNB handover.
Figure 10B:
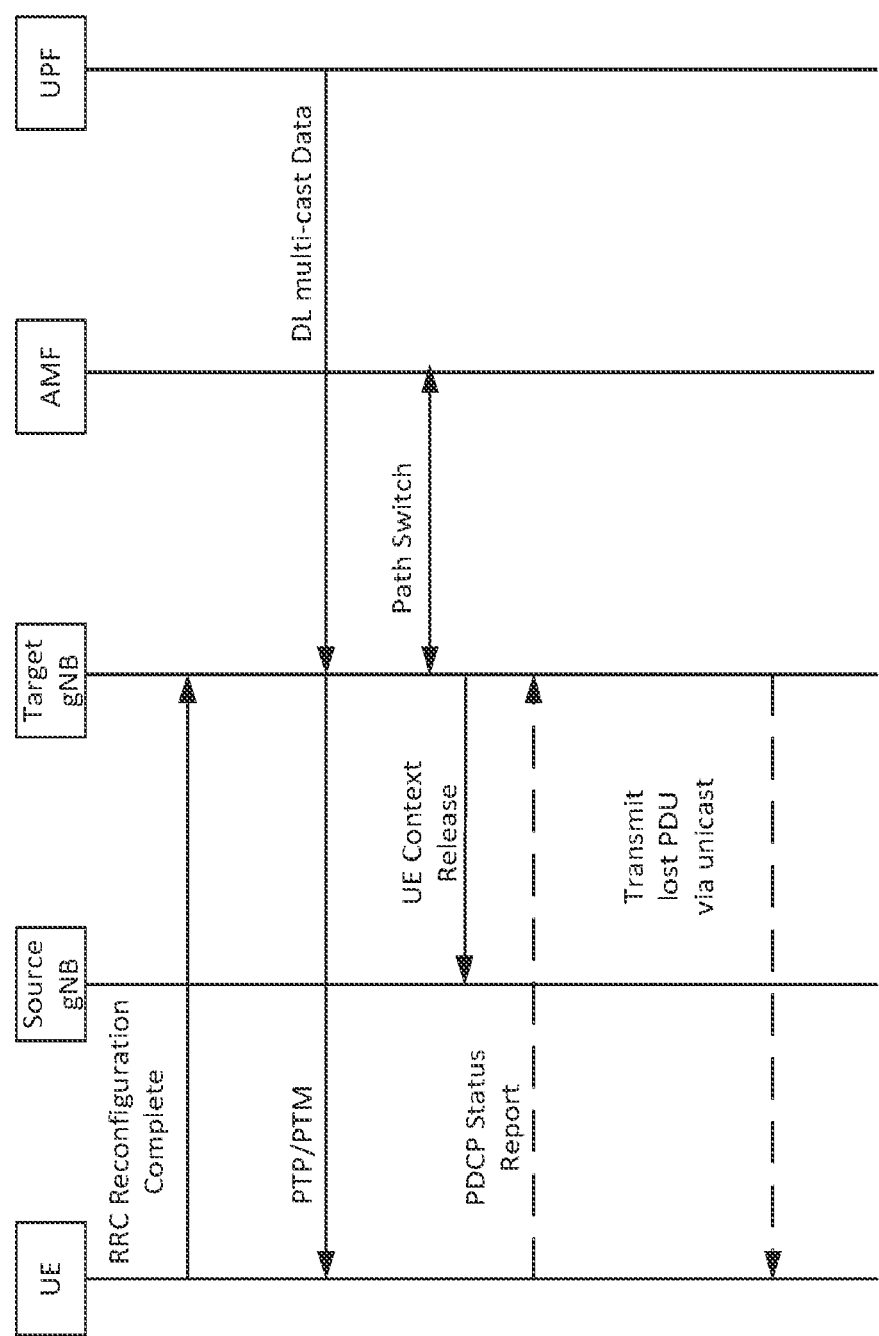

A baseline procedure for inter-gNB handover for NR MBS is shown in FIGS. 10A and 10B See R2-2006794, NR Multicast dynamic PTM PTP switch with service continuity, Qualcomm Inc.

Figure 11A:
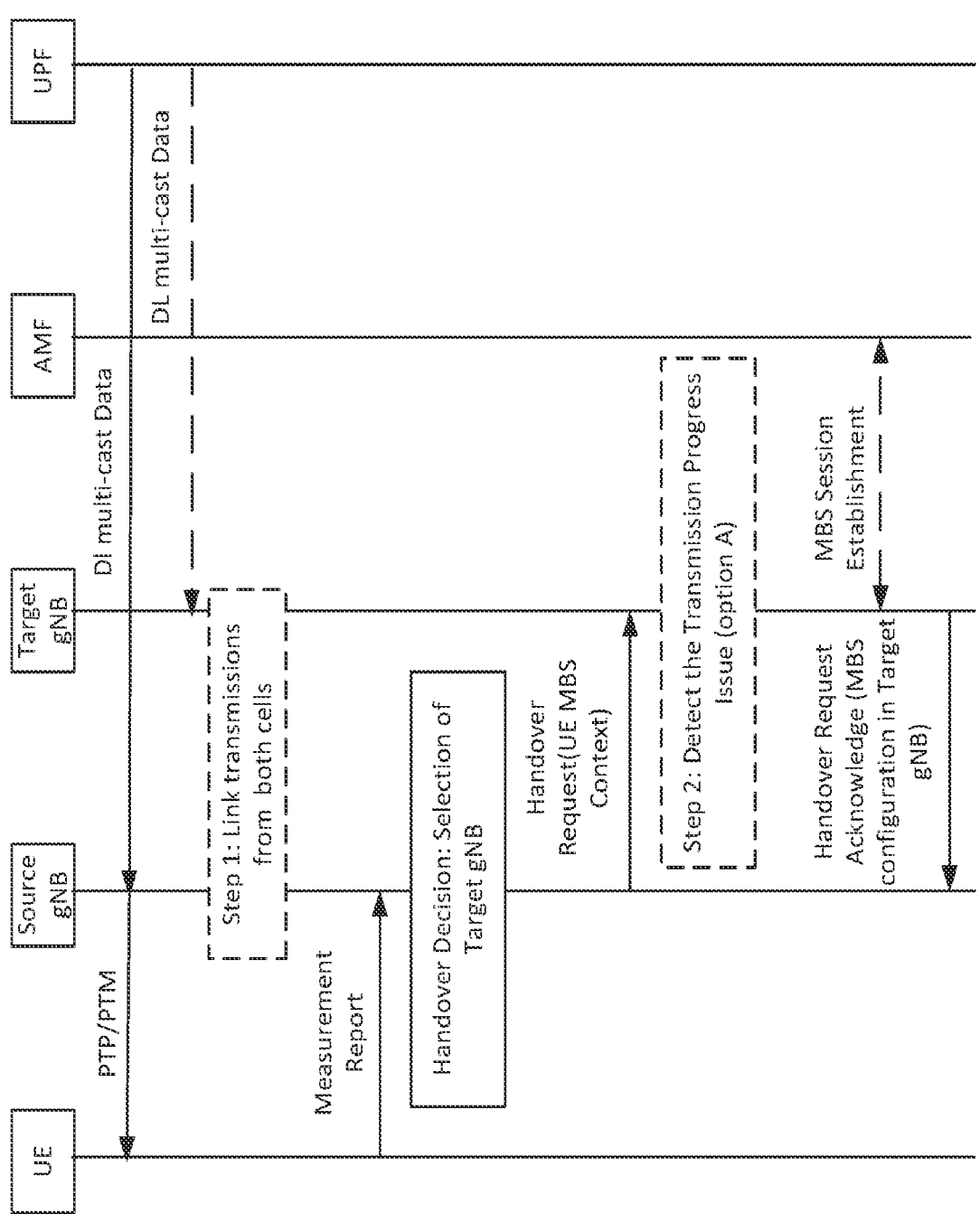
FIGS. 11A and 11B show a call flow of an example of enhancements/modifications to a handover procedure.
Figure 11B:
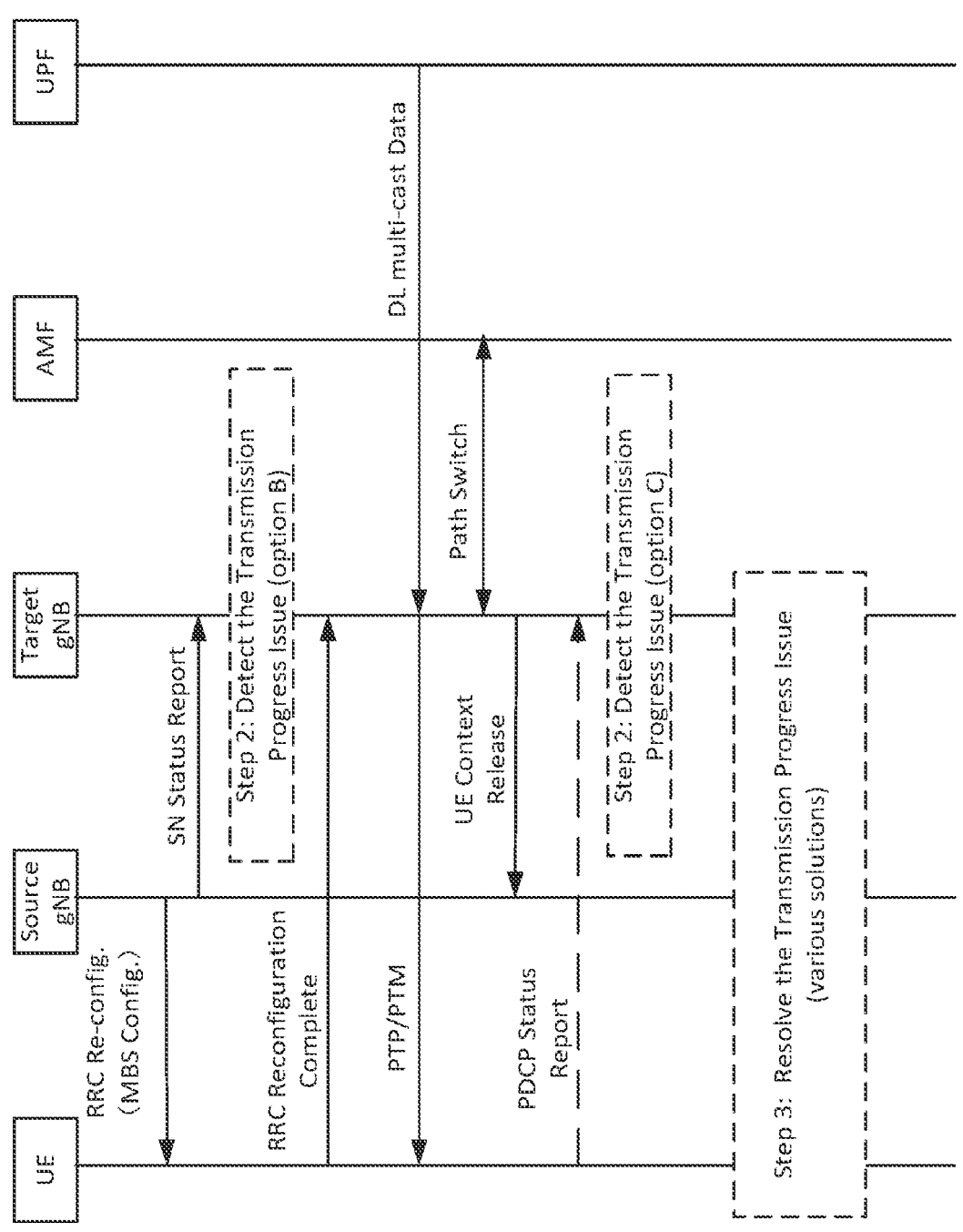

In the following, enhancements/additions are proposed to this baseline procedure to address the unsynchronized transmission progress between the source cell and target cell (referred to as the progress gap problem). These enhancements/additions are also depicted in FIGS. 11A and 11B. This problem needs to be solved in order to guarantee that no packets are lost as a result of the handover (also referred to as a lossless handover.)

Figure 12A:
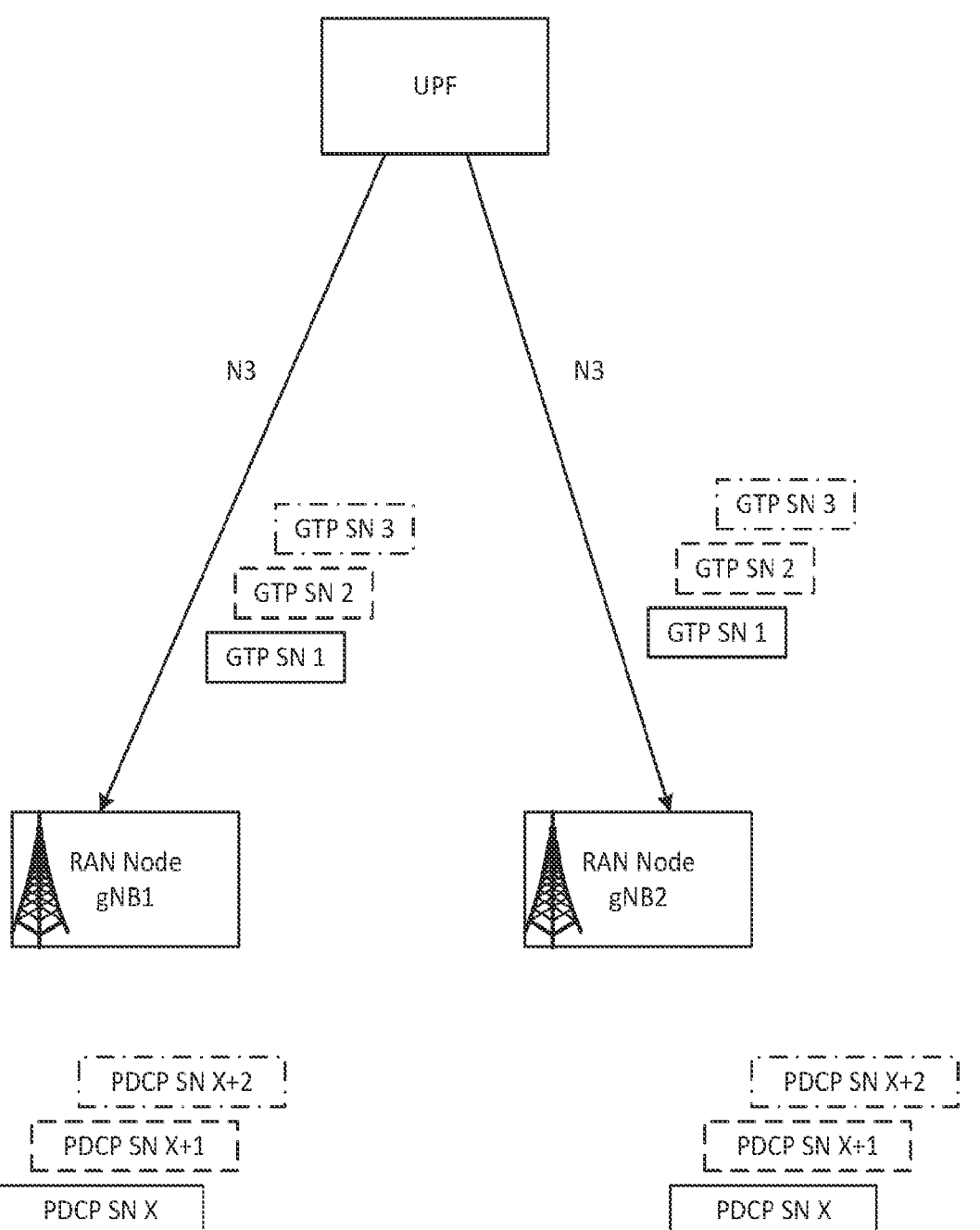
FIG. 12A illustrates an of example of sequence numbers at gNBs, where the gNBs have the same mapping.
Figure 12B:
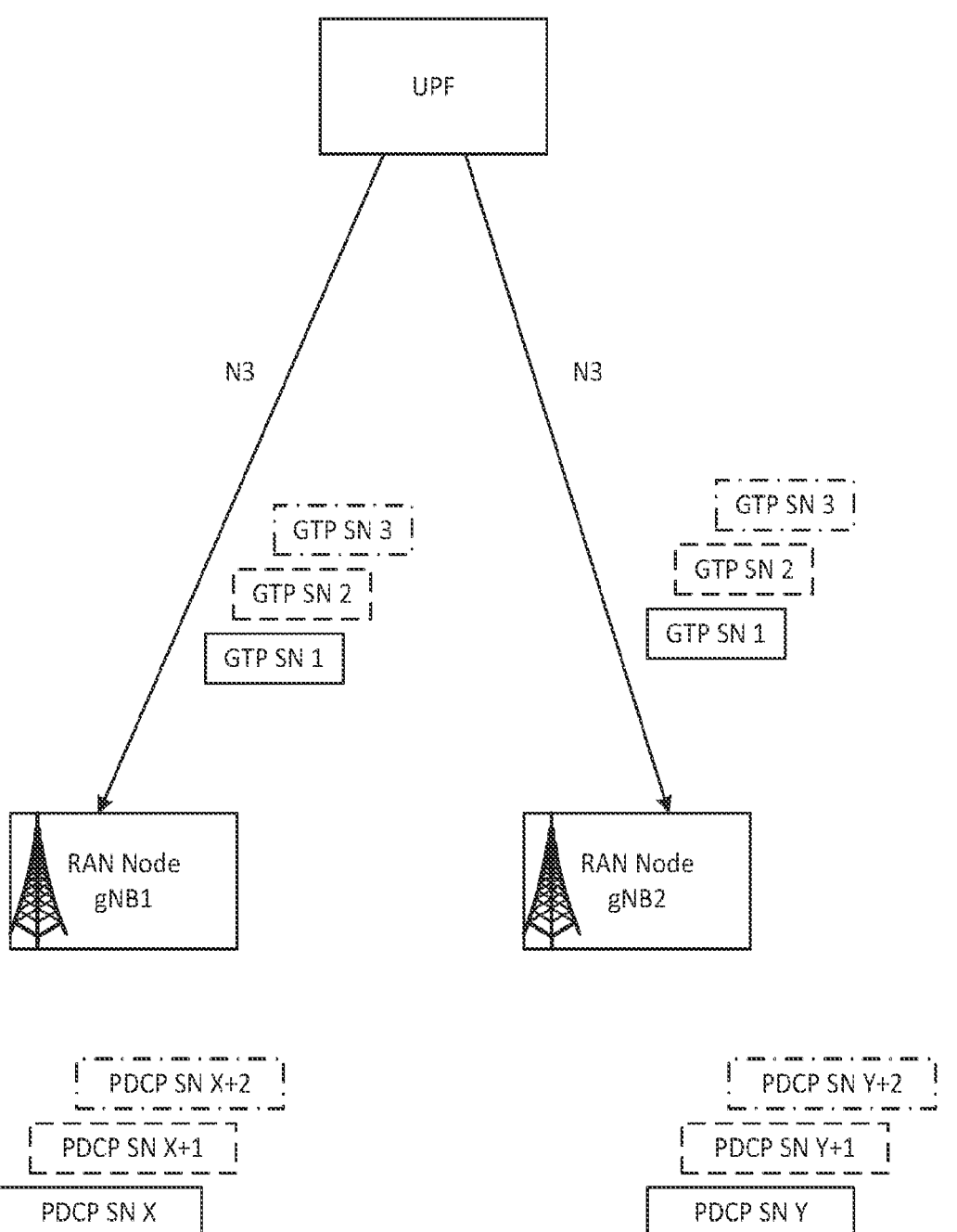
FIG. 12B illustrates an of example of sequence numbers at gNBs, where the gNBs have different mappings.

As a first step (step 1 of FIG. 11A), it is proposed to link the transmissions from the source cell and target cell. The linking may be achieved by basing the transmissions over both cells on a common reference. For example, the UPF may use a GTP tunnel to carry the traffic over the N3 (or an N3-like) interface between the UPF and each of the RAN nodes participating in the transmission of the MBS service. In such a case, the GTP header of the PDU carries a sequence number (SN). In a typical deployment envisaged by SA2, the UPF has a separate GTP tunnel to each of the RAN nodes participating in the transmission of the MBS service. Each MBS PDU sent from the UPF shares the same GTP SN. The gNBs may then maintain a mapping of GTP SN to PDCP SN. FIG. 12B shows a case where each gNB maintains a different mapping (GTP SN 1 maps to PDCP SN X for gNB1 and GTP SN 1 maps to PDCP SN Y for gNB2). Alternatively, FIG. 12A shows a case where the mapping of GTP SN to PDCP SN may be the same for all gNBs. (GTP SN 1 maps to PDCP SN X for gNB1 and GTP SN 1 maps to PDCP SN X for gNB2). The mapping may be defined as a simple offset to the GTP SN.

As a second step (Step 2), the target gNB may detect that there is a progress gap problem between a source cell and a target cell. To assist this detection, the source gNB can provide the indication of the PDCP SN (and/or GTP SN) transmitter status for the source cell, to the target gNB. This indicates the next PDCP SN that the source cell would assign for any new MBS PDU that needs to be transmitted in the source cell. This may be provided to the target gNB during the HO Request message between the source gNB and the target gNB (shown as Option A). Alternatively, this may be provided during a separate SN Status Report exchange between the source gNB and target gNB, typically after the target gNB accepts the HO request (shown as Option B). At this point, the target gNB is aware of the MBS PDU transmission gap between the target cell and the source cell. Target cell may be ahead of the source cell, implying that it has already transmitted certain MBS PDUs that have not been transmitted in the source cell, and as a result that the UE has not yet received). Alternatively target cell may be behind the source cell, implying that it has not yet transmitted certain MBS PDUs that have already been transmitted in the source cell, and as a result that the UE may have already received.

Alternatively, the source cell may send an indication of its mapping rule to the target cell. For example, source gNB may provide the offset used to map the GTP SN to the PDCP SN for the source cell. This may be provided to the target gNB either during the HO request message or the SN Status Report message. After the handover, the UE may provide an indication of its missing PDCP SNs by sending a PDCP Status Report to the target gNB. The target gNB uses the mapping rule information previously provided by the source gNB, to determine the missing GTP SNs. With this determination, the target gNB knows if the target cell is behind or ahead of the source cell. In addition, it also knows the MEMS PDUs that need to be re-transmitted because they have not been received at the UE, and which MBMS PDUs will be received as duplicate, because they have already been received at the UE (shown as Option C).

Alternatively, a new Xn signaling exchange may be defined between the source gNB and the target gNB to detect the progress gap problem. The source gNB may send a SN STATUS message to the target gNB indicating an MBS service identifier, a mapping rule for this service, and/or the last PDCP PDU SN successfully transmitted to the UE in the source cell.

The target gNB may acknowledge the message (SN STATUS ACK) message, providing a list of PTM radio bearer identifiers providing the MBS service. For each PTM radio bearer, the target gNB may provide an indication of whether the MBS transmission is progress aligned to the source cell, an indication of the mapping rule used for the service, and/or an indication of the last PDCP PDU SN successfully transmitted on this PTM radio bearer.

Based on this information, both the source gNB and the target gNB may determine if the MBS transmission progress in source cell is ahead or behind the MBS transmission progress in target cell.

Alternatively, the initial HO Request message is used between the source gNB and the target gNB, but the target gNB responds with a new SN STATUS ACK message to inform the source gNB about the status of the PDCP transmissions on the PTM radio bearers in the target cell.

Once the target gNB has detected the Progress Gap problem for a target cell, the target gNB may take steps to resolve this problem (step 3). The solutions are divided into two cases. Case 1 deals with the case in which the target cell is ahead of the source cell. Case 2 deals with the case in which the target cell is behind the source cell.

Lossless Handover—Case 1: Target Cell Ahead of the Source Cell

The following methods may be used individually or in combination for the case that the target cell is ahead of the source cell. These methods may be used to handle the missing PDUs resulting from the handover. In these methods, the source gNB uses the methods in Step 2 to determine that the source cell MBS transmissions are behind the transmissions in the target cell, or the target gNB informs the source gNB that the source cell transmissions are behind the transmissions in the target cell. In either option, the target cell has already transmitted these MBS PDUs. If these PDUs are not available at the target gNB, the source gNB may need to forward these PDUs to the target gNB (these will be referred to as Handover PDUs). In the following, methods, the MBS traffic in the source cell is always shown as a PTM bearer. It should be understood that this is only one example. The MBS traffic in the source cell may be received using other reception modes (PTP bearer, shared PTM bearer split bearer with one PTP leg and one PTM leg).

Note that in the following figures, the only entities shown are the gNBs, the UPF, and the UE. It should be understood that this is only to simplify the presentation of the methods. The signaling exchanges between RAN nodes is between gNBs, but transmissions over the air interface are over cells controlled by the respective gNBs. A gNB may transmit over one or more cells.

Furthermore, note that in the figures, the MBS PDUs have a number associated with them. This number is not necessarily part of the MBS PDU. It is an identifier used to identify specific MBS PDUs and facilitate the description.

Figure 13:
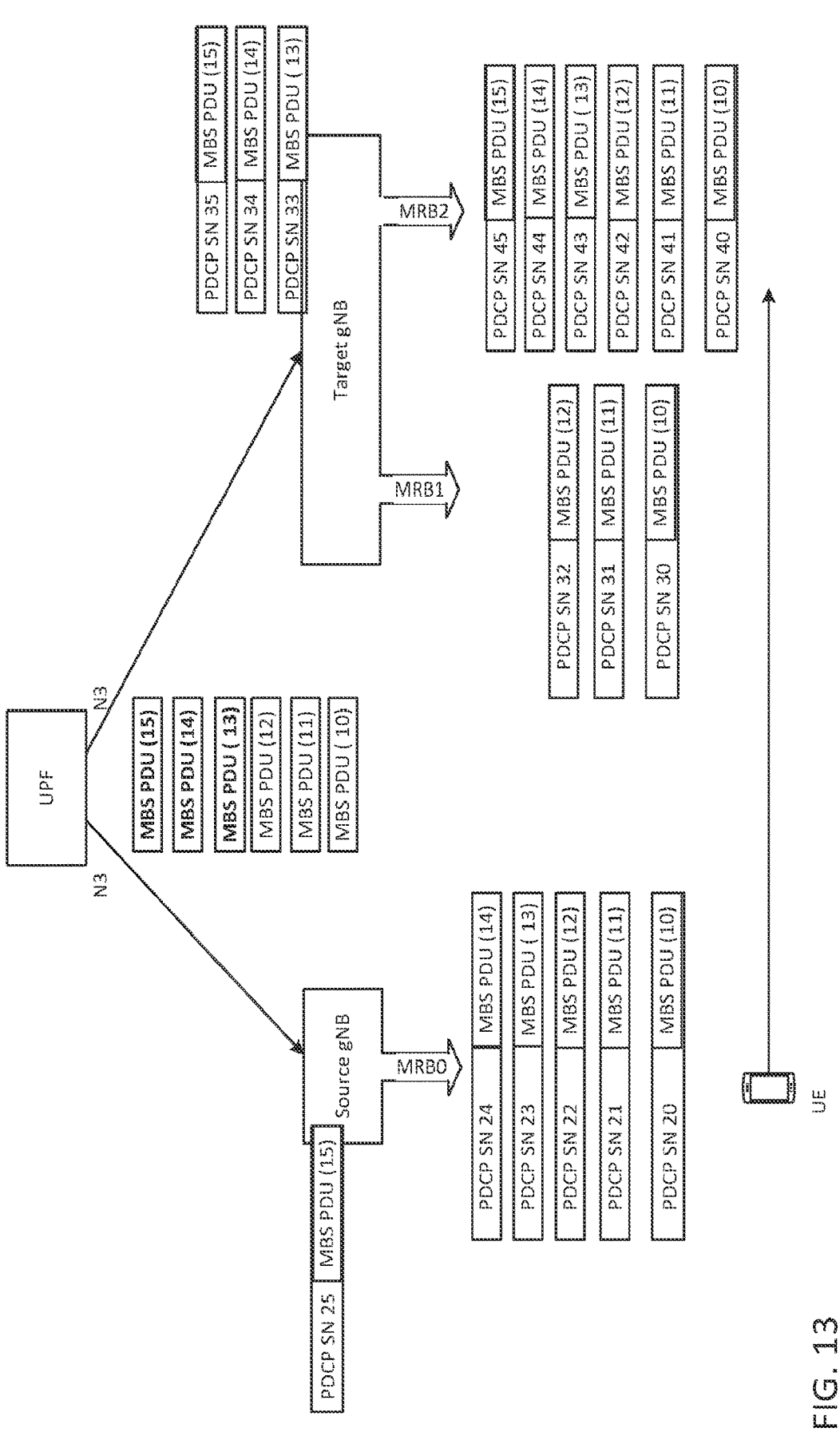
FIG. 13 is a block diagram illustrating an example of choosing a best MBS radio bearer in a target cell.

Method 1: Select from the multiple PTM radio bearers in the target cell which minimizes or eliminates the progress gap. This solution relies on the target cell having multiple PTM radio bearers to serve a single MBS QoS flow. Each of these PTM radio bearers is destined for a different group of UEs. As the scheduling of these PTM radio bearers is independent, there may be a progress gap even between PTM radio bearers of a single MB S QoS flow within a single cell. During the admission control process at the target gNB, the target gNB may select the PTM radio bearers of the target cell which minimizes or eliminates the progress gap. A typical example is shown in FIG. 13. In this figure we have 6 MBS PDUs sent from the UPF to the source gNB and target gNB (identified as 10 to 15). Source cell has sent 5 of these on an MBS radio bearer (PDCP SN from 20-24). The last MBS PDU is waiting for transmission. At the target cell, the MBS service is provided through 2 MBS radio bearers (MRB1 and MRB2). Based on the scheduling and the UEs receiving each of these radio bearers, the progress of the MBS service over these 2 radio bearers is not the same. In this case, MBS radio bearer 2 is ahead of the pace of the MBS radio bearer in the source cell, while MBS radio bearer 1 is behind the pace of the MBS radio bearer in the source cell. To avoid potentially missing an MBS PDU, the target gNB may select MBS radio bearer 1 to serve the incoming UE.

Method 2: After receiving a Handover Request Acknowledge, the source gNB may forward a copy of all future PDCP PDUs in the source cell, to the target gNB. The target gNB may decide to use an existing target cell PTM radio bearer and send this configuration to the UE (in the Handover Request Acknowledge message). The target gNB may then retransmit these on the target cell PTM radio bearer configured for the UE, by (1) recovering the MBS PDU, (2) determining the GTP SN corresponding to this MBS PDU, and (3) retransmitting this with PDCP SN of the target cell.

Figure 14:
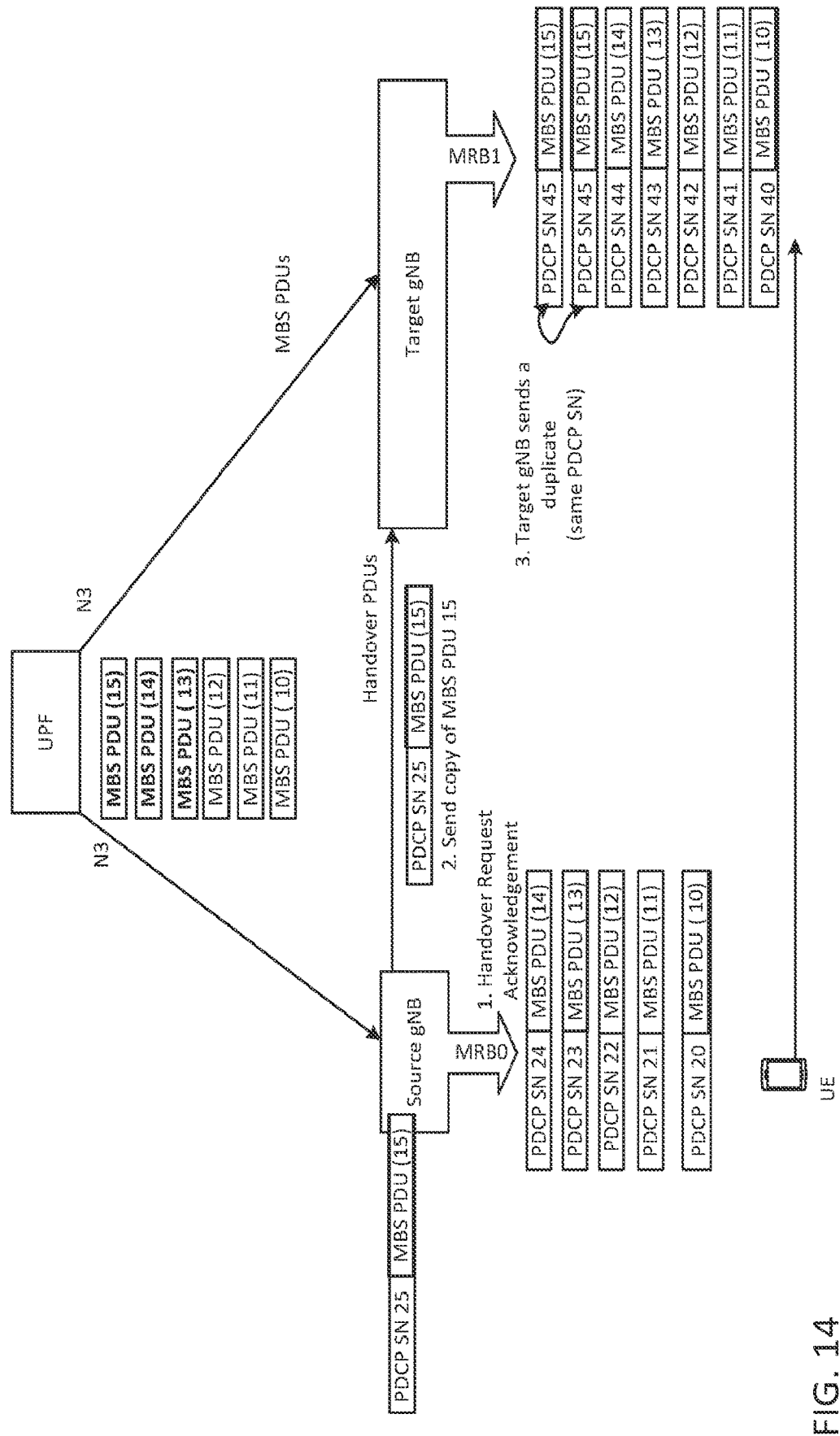
FIG. 14 is a block diagram illustrating an example of repeating MBS PDU on a target cell.

The drawback of this approach is that the UEs already receiving this PTM radio bearer will receive duplicates of these MBS PDUs. Furthermore, this may delay the progress of the MBS transmission in the target cell as it has to first clear the backlog of PDUs that have to be retransmitted. A typical example is shown in FIG. 14, In this figure we have 6 MBS PDUs sent from the UPF to the source gNB and target gNB (identified as 10 to 15). Source cell in source gNB has sent 5 of these on an MBS radio bearer (PDCP SN from 20-24). The last MBS PDU is waiting for transmission. At the target cell, the MBS service is provided through an existing MBS radio bearer. The target cell has already transmitted MBS PDU 15. After Handover Request acknowledgement, the source gNB forwards a copy of MBS PDU 15 to the target gNB, which extracts the MBS PDU and transmits a duplicate of this PDU in the target cell.

Figure 15:
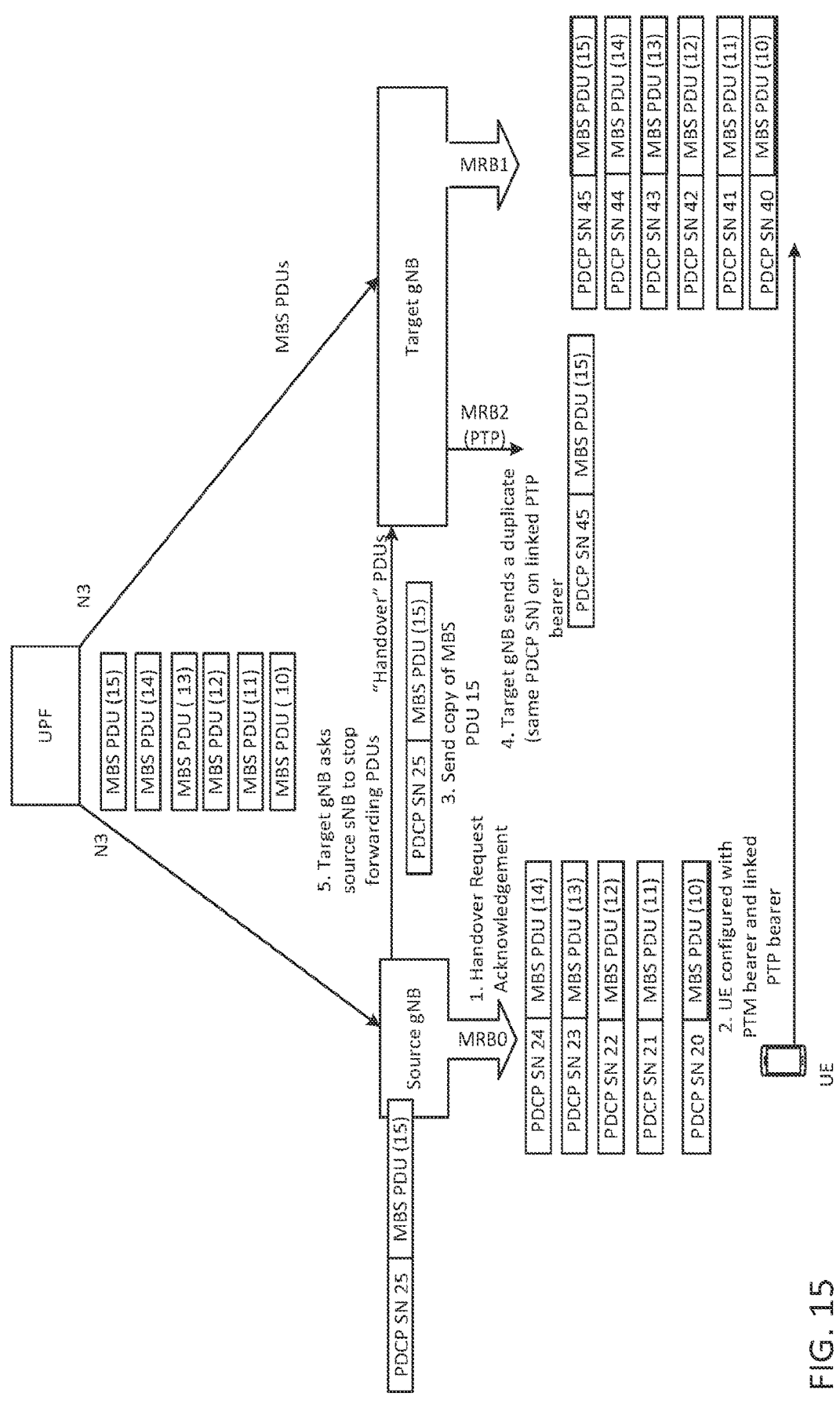
FIG. 15 is a block diagram illustrating an example of using linked PTP radio bearer.

Method 3: After receiving a Handover Request Acknowledge, the source gNB may forward a copy of all future PDCP PDUs in the source cell, to the target gNB. The target gNB may decide to use an existing target cell PTM radio bearer and also link this PTM radio bearer to a dedicated PTP radio bearer. Alternatively, the target cell may use a split bearer with a PTM leg and a PTP leg. The PTM radio bearer and the linked PTP radio bearer may share a common PDCP layer. The linked dedicated PTP bearer may be used for clearing up the Handover PDUs (as suggested in the baseline inter-gNB handover in FIGS. 10A and 10B). Once the Handover PDUs have been sent, the target gNB may continue sending the MBS traffic over target cell PTM radio bearer. The linked PTP may be released after the handover PDUs have been transmitted or after a timer expires. It may also signal to the source gNB to stop forwarding copies of PDCP PDUs. A typical example is shown in FIG. 15. In this figure we have 6 MBS PDUs sent from the UPF to the source gNB and target gNB (identified as 10 to 15). Source cell has sent 5 of these on an MBS radio bearer (PDCP SN from 20-24). The last MBS PDU is waiting for transmission. The target gNB configures the UE with a target cell PTM radio bearer and a linked PTP radio bearer. The Handover PDUs are sent over the linked PTP radio bearer.

Figure 16:
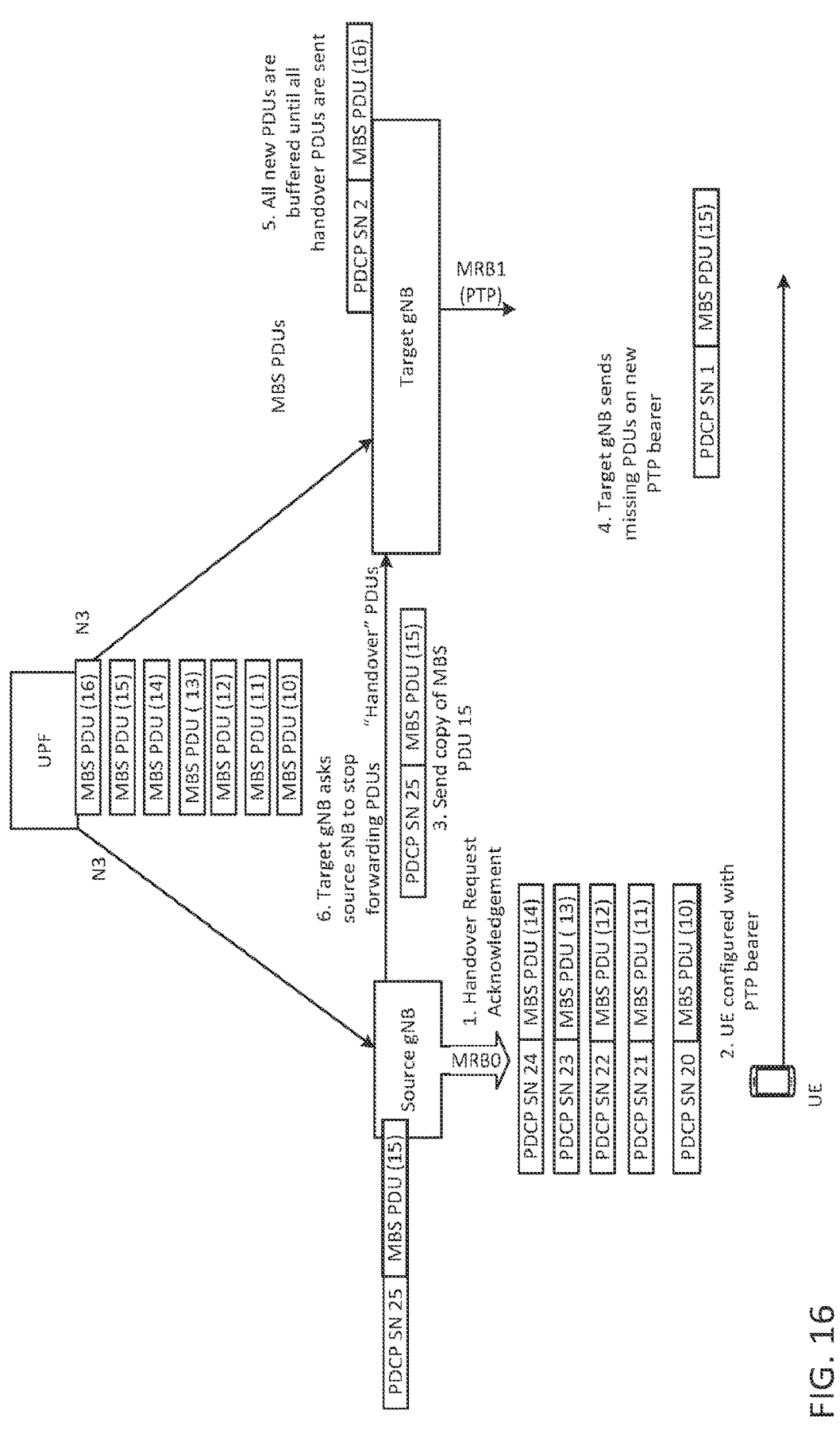
FIG. 16 is a block diagram illustrating an example of new PTP bearer & buffer new MBS PDUs.

Method 4: After receiving a Handover Request Acknowledge, the source gNB may forward a copy of all future PDCP PDUs of the source cell, to the target gNB. The target gNB may decide to use a dedicated PTP radio bearer for the UE. The target gNB creates the new dedicated bearer and maps the MBS QoS flow to this bearer. This bearer buffers the traffic from the UPF until all handover PDUs from the source cell have been transmitted. Once the handover PDUs have been sent, the target cell may continue sending the MBS traffic over PTP radio bearer or switch to a PTM radio bearer or to a split bearer with a PTP leg and a PTM leg. It may also signal to the source gNB to stop forwarding copies of PDCP PDUs. A typical example is shown in FIG. 16. Note that MBS PDU 15 is sent to target gNB for transmission over the PTP radio bearer. All new MBS PDUs need to wait until the handover PDUs are transmitted.

Method 5: After receiving a Handover Request Acknowledge, the source gNB may forward a copy of all future PDCP PDUs from the source cell, to the target gNB. The target gNB may decide to use a new PTM radio bearer for the UE. The target gNB creates the new target cell PTM bearer and maps the MBS QoS flow to this bearer. This bearer buffers the traffic from the UPF until all handover PDUs from the source gNB have been transmitted. Once the handover PDUs have been sent, the target gNB may signal to the source gNB to stop forwarding copies of PDCP PDUs.

Figure 17:
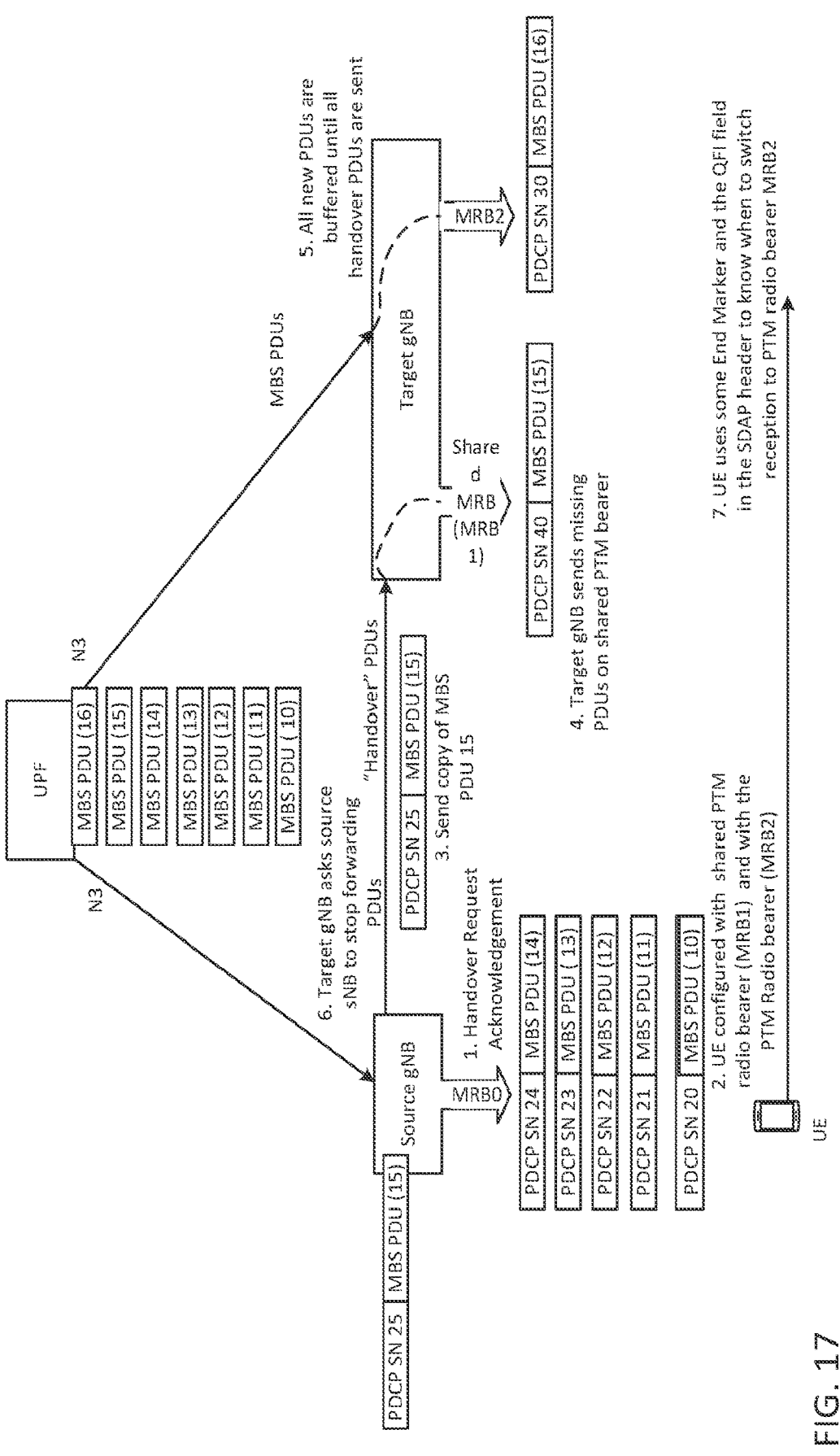
FIG. 17 is a block diagram illustrating an example of using Shared PTM Radio bearer for handover PDUs.

Method 6: The gNBs maintain a special shared PTM radio bearer in a cell, which may be used for transmitting handover PDUs. The special shared PTM radio bearer may be used by one or more UEs that are waiting to receive missing PDUs. Note that the special shared PTM radio bearer may be used for other reasons where a UE is missing an MBS PDU. In this solution, after receiving a Handover Request Acknowledge, the source gNB may forward a copy of all future PDCP PDUs from the source cell to the target gNB. The target gNB may decide to use this special shared PTM radio bearer for the handover PDUs and to use a second MBS radio bearer for the PDUs of the MBS flow. The second MBS radio bearer may be a new PTM radio bearer, an existing PTM radio bearer, a new PTP bearer, or a split bearer with a PTM leg and a PTP leg. The UE starts receiving on the special shared radio bearer for the handover PDUs and on the other radio bearer for the new MBS PDUs. The UE may use the QFI field in the SDAP header to link the PDUs from the two radio bearers, for example these would share the same QFI value. An indication may need to be sent to the UE to indicate when the UE should start forwarding MBS PDUs from the second MBS radio bearer. This indication may be based on an End Marker carried as a PDU on the shared PTM radio bearer, or it may be based on a bit or bit-pattern carried in the SDAP header (for example by reusing the non-used SDAP header fields such as RDI and RQI). After receiving this indication, the UE may stop/release the shared PTM radio bearer. A typical example is shown in FIG. 17

Method 7: After receiving a Handover Request Acknowledge, the source gNB may forward a copy of all future PDCP PDUs from the source cell, to the target gNB. The target gNB may decide to use an MBS radio bearer for the PDUs of the MBS flow. This MBS radio bearer may be a new PTM radio bearer, an existing PTM radio bearer, or a new PTP bearer. As part of the RRC Reconfiguration, the UE is provided the configuration of this new MBS radio bearer, as well as an indication that the UE should not release the PDCP entity associated with the source cell. The handover PDUs are carried in the new MBS radio bearer, but these carry an indication that these should be sent to the PDCP entity of the source cell for further processing. This indication may be based on a reserved QFI carried in the SDAP header. Alternatively, it may be based on a bit or bit-pattern carried in the SDAP header (for example by reusing the non-used SDAP header fields such as RDI and RQI).

Figure 18:
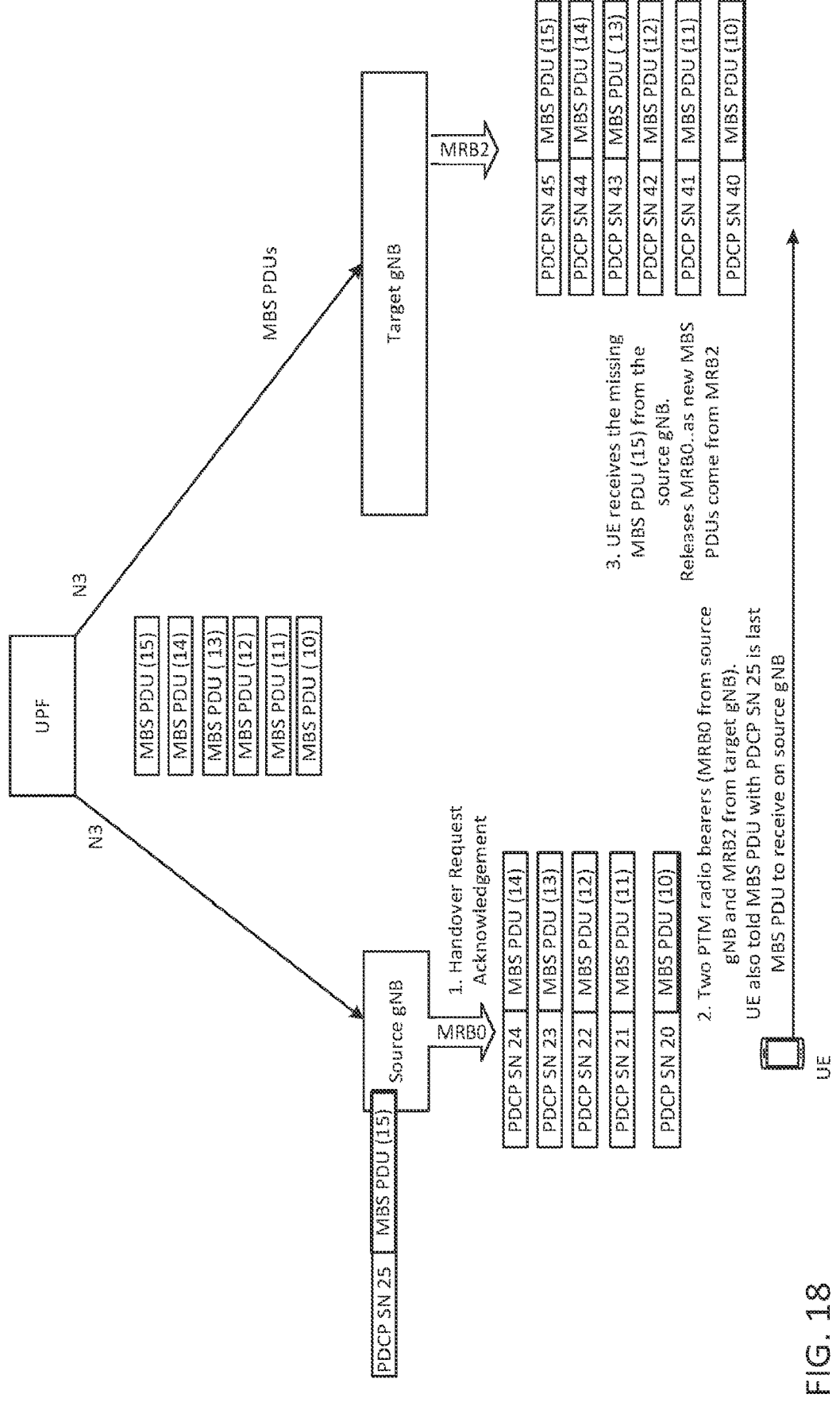
FIG. 18 is a block diagram illustrating an example of maintaining MBS radio bearers on both source and target gNB.

Method 8: The UE may simultaneously maintain both the MBS radio bearer in the source cell and the new MBS radio bearer in the target cell. The RRC Reconfiguration message may indicate to the UE the new MBS radio bearer configuration, as well as the last PDCP PDU to be processed in the source cell. After successfully receiving this last PDCP PDU, the UE may autonomously release the MBS radio bearer in the source cell. A typical example is shown in FIG. 18. In this figure we have 6 MBS PDUs sent from the UPF to the source gNB and target gNB (identified as 10 to 15). Source gNB has sent 5 of these on a source cell MBS radio bearer (PDCP SN from 20-24). The last MBS PDU is waiting for transmission. For the target cell, the MBS service is provided through an existing MBS radio bearer. The target cell has already transmitted MBS PDU 15. After Handover Request acknowledgement, the UE is configured with 2 PTM radio bearers (MRB0 from the source cell and MRB2 from the target cell). The UE receives MBS PDU 15 from MRB0 and subsequent MBS PDUs from MRB2.

Duplicate Reception—Case 2: Target Cell Behind the Source Cell

The following methods may be used individually or in combination for the case that the target cell is behind the source cell. In these methods, the source gNB uses the methods in Step 2 to determine that the source cell MBS transmissions are ahead of the transmissions in the target cell, or the target gNB informs the source gNB that the source cell transmissions are ahead of the transmissions in the target cell. In either option, the target cell has not yet transmitted these MBS PDUs—they may be in buffers awaiting transmission or they may be en-route from the UPF. In such a case, the source gNB need not forward these packets to the target gNB (no handover PDUs).

In cases where the target cell is behind the source cell the UE may potentially receive the same MBS PDU (duplicates)—but at different times and from different cells. As these MBS PDUs are transmitted from different cells, the same MBS PDU may have a different PDCP SN in each of the cells. In order to detect the duplicates, the UE needs a mechanism to link the PDCP SNs from the source cell and the target cell. During the Handover request or the SN Status Report, the source cell may provide an indication of the progress of its own transmission (for example through the PDCP SN or GTP SN).

The target cell may then be able to determine the last MBS PDU that was transmitted to the UE in at least two ways.

First, if the target cell decides to use a new PTM radio bearer or new PTP radio bearer for the MBS service, it provides the MBS configuration to the UE (in the Handover Request Acknowledgement). Target gNB starts its MBS transmissions over the target cell from the next MBS PDU awaiting transmission. That is, it continues from where the transmission has stopped in the source cell. In this case, the UE would not receive in duplicate packets as a result of the handover.

Second, if the target cell decides to use an existing MBS service, then the target cell is already progressing with its own MBS transmissions, using its own PDCP SNs. In such case, the target cell may provide the MBS configuration to the UE (in the Handover Request Acknowledgement). As part of this MBS configuration, the target cell may also provide an indication of which upcoming PDCP PDUs will be duplicates (the UE would have already received these in the source cell). This indication may be in terms of a LAST_DUPLICATE_PDCP_SN. For example, the target gNB may tell the UE that any PDCP PDU received with SN<X is a duplicate. Alternatively, this indication may be in terms of a NEXT_EXPECTED_PDCP_SN. In addition, the MBS configuration may include additional information to assist the UE in determining if any MBS PDUs have been lost. This may be a Boolean indication, a number of lost PDUs, etc. Alternatively, the target gNB may provide a PDCP_SN_OFFSET, which tells the UE the offset between the source cell PDCP SN and the target cell PDCP SN:

$$PDCP\_SN\_OFFSET=(target\ cell\ PDCP\ SN\ for\ a\ given\ MBS\ PDU)-(source\ cell\ PDCP\ SN\ for\ the\ same\ MBS\ PDU)$$

The reference for the offset (PDCP_SN_OFFSET) may be the source cell SN or the target cell SN. This may be signaled as a source positive integer with an indication of the reference (for example target cell is ahead of source cell). Alternatively, this may be signaled using both positive/negative integers using a standardized reference. This may be signaled as part of the RRC Reconfiguration provided during the handover procedure.

Figure 19:
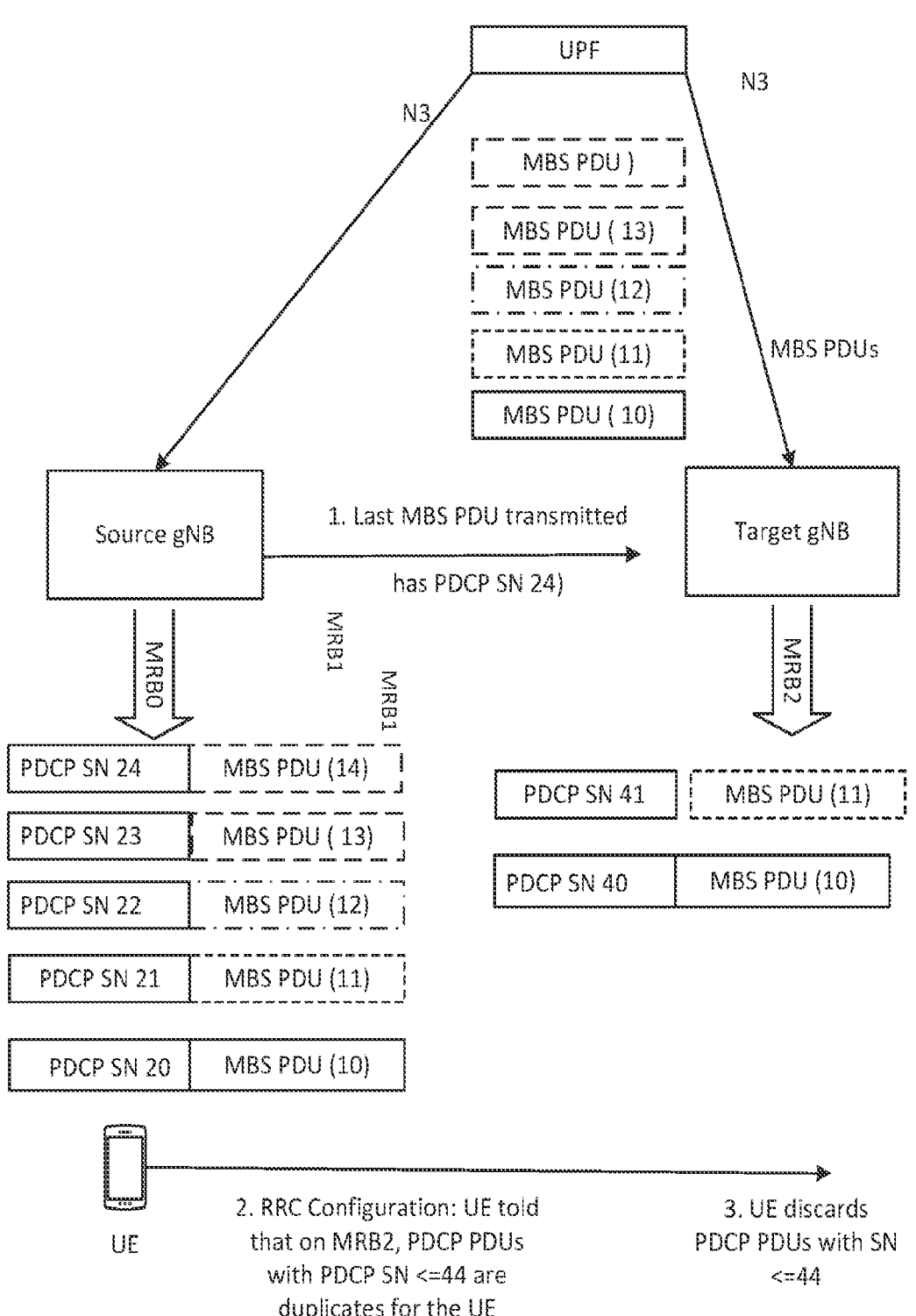
FIG. 19 is a block diagram illustrating a further example of PDU management.

Upon receiving PDCP PDUs in the target cell, the UE would then use the information provided in the RRC configuration information to identify the duplicate MBS PDUs and discard the duplicates. For example, if the target cell provides the LAST_DUPLICATE_PDCP_SN, the UE would discard all PDCP SDUs with SN less than or equal to the configured LAST_DUPLICATE_PDCP_SN. If the target cell provides the PDCP_SN_OFFSET, it would use this offset to determine the equivalent PDCP SN in the source cell, and then determine and discard all duplicates. A typical example is shown in FIG. 19. In this figure we have 5 MBS PDUs sent from the UPF to the source gNB and target gNB (identified by SN 10 to SN 14). Source gNB has sent all 5 of these on an MBS radio bearer of the source cell (PDCP SN from 20-24). At the target gNB, the MBS service is already being offered, but it is progressing slower. The target cell has only transmitted 2 MBS PDUs (10 and 11). During the Handover request, the source gNB includes the identity of the last MBS PDU transmitted in source cell (PDCP SN 24). When the target gNB configures the UE for the PTM radio bearer (MRB2) over the target cell, it includes the SN of the last PDCP PDU that will be a duplicate (PDCP PDU SN 44). When receiving PDCP PDUs with SN 42, 43, 44, the UE knows that these are duplicate PDUs and can be discarded.

If the UE is provided with the PDCP SN offset, the UE may use this offset to link the PDCP PDUs received in the source cell and the target cell. For example, say the configured offset tells the UE that the target cell is 10 SNs ahead of the source cell. If the last successfully received PDCP PDU in the source cell has a SN of 5, the UE knows that the SN following in the target cell should be 5+1+offset=16. If the UE receives PDCP PDU SN<=16, UE knows that these are duplicate. If the first PDCP PDU in the target cell has PDCP PDU SN=18, UE knows that two PDCP PDUs have been lost (with SN 16 and SN 17).

Dynamic Switching During Handover

As part of the handover procedure for IVIES, the target gNB may need to switch the delivery method for the MBS traffic in the target cell. In selecting the MBS configuration to be used by the UE, the target gNB may consider current MBS configuration in the cell, the number of UEs in the cell using this configuration, and/or thresholds to determine when to switch between configurations In some cases, it is possible that a target cell is offering an MBS service over multiple PTP radio bearers (one radio bearer to each UE). As a result of the incoming UE, the target cell may pass a threshold and determine that the service may be better offered over a single (or multiple) PTM radio bearers or a single or multiple split bearers. In such a case, the impact of the handover is not only on the incoming UE, but also the other UEs that were receiving MBS service over the PTP radio bearers. Each of these PTP radio bearers is progressing with its MBS transmission at its own pace, and once these UEs are switched to a single PTM radio bearer, the different MBS transmission progress across the PTP bearers needs to be considered. For example, one bearer may have already transmitted MBS PDU 5 while another may have only transmitted MBMS PDU 3.

To resolve this and make sure no UE has missing MBS PDUs, it is proposed to determine the earliest MBS PDU that has yet to be transmitted among all the transmissions to all the UEs. That is, the PTP configuration that is most behind in terms of IVIES transmission progress (as all PTP radio bearers to the UEs are progressing at a different pace). When sending the reconfiguration message to each of the UEs to switch from a PTP to a PTM radio bearer, the reconfiguration message includes an indication of which MBS PDUs will be duplicate for this UE. A mechanism may be used that is similar to that described herein in reference to duplicate reception Case 2—target cell behind the source cell. The gNB starts the PTM transmission from the earliest MBS PDU (even if this means that some UEs will receive duplicate MBS PDUs.)

Example Environments

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G." 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 7 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

Figure 20A:
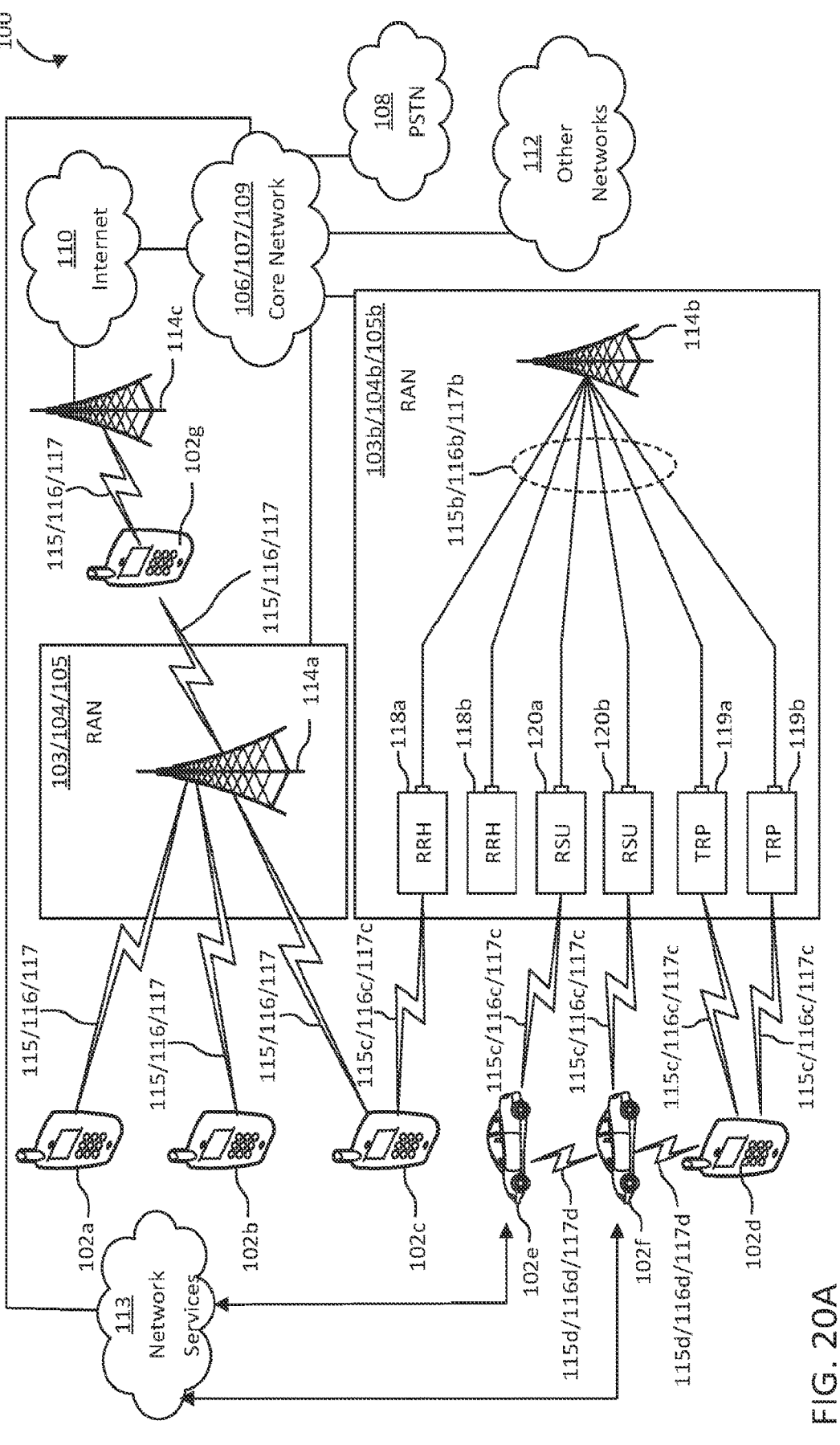
FIG. 20A illustrates an example communications system.

FIG. 20A illustrates an example communications system 100 in which the systems, methods, and apparatuses described and claimed herein may be used. The communications system 100 may include wireless transmit/receive units (WTRUs) 102a, 102b, 102c, 102d, 102e, 102f, and/or 102g, which generally or collectively may be referred to as WTRU 102 or WTRUs 102. The communications system 100 may include, a radio access network (RAN) 103/104/

105/103b/104b/105b, a core network 106/107/109, a public switched telephone network (PSTN) 108, the Internet 110, other networks 112, and Network Services 113. 113. Network Services 113 may include, for example, a V2X server, V2X functions, a ProSe server, ProSe functions, IoT services, video streaming, and/or edge computing, etc.

It will be appreciated that the concepts disclosed herein may be used with any number of WTRUs, base stations, networks, and/or network elements. Each of the WTRUs 102 may be any type of apparatus or device configured to operate and/or communicate in a wireless environment. In the example of FIG. 20A, each of the WTRUs 102 is depicted in Figures as a hand-held wireless communications apparatus. It is understood that with the wide variety of use cases contemplated for wireless communications, each WTRU may comprise or be included in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane, and the like.

The communications system 100 may also include a base station 114a and a base station 114b. In the example of FIG. 20A, each base stations 114a and 114b is depicted as a single element. In practice, the base stations 114a and 114b may include any number of interconnected base stations and/or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, and/or the other networks 112. Similarly, base station 114b may be any type of device configured to wiredly and/or wirelessly interface with at least one of the Remote Radio Heads (RRHs) 118a, 118b, Transmission and Reception Points (TRPs) 119a, 119b, and/or Roadside Units (RSUs) 120a and 120b to facilitate access to one or more communication networks, such as the core network 106/107/109, the Internet 110, other networks 112, and/or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, and/or other networks 112.

TRPs 119a, 119b may be any type of device configured to wirelessly interface with at least one of the WTRU 102d, to facilitate access to one or more communication networks, such as the core network 106/107/109, the Internet 110, Network Services 113, and/or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, and/or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations and/or network elements (not shown), such as a Base Station Controller (BSC), a Radio Network Controller (RNC), relay nodes, etc. Similarly, the base station 114b may be part of the RAN 103b/104b/105b, which may also include other base stations and/or network elements (not shown), such as a BSC, a RNC, relay nodes, etc. The base station 114a may be configured to transmit and/or receive wireless signals within a particular geographic region, which may be referred to as a cell (not shown). Similarly, the base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, for example, the base station 114a may include three transceivers, e.g., one for each sector of the cell. The base station 114a may employ Multiple-Input Multiple Output (MIMO) technology and, therefore, may utilize multiple transceivers for each sector of the cell, for instance.

The base station 114a may communicate with one or more of the WTRUs 102a, 102b, 102c, and 102g over an air interface 115/116/117, which may be any suitable wireless communication link (e.g., Radio Frequency (RF), microwave, infrared (IR), ultraviolet (UV), visible light, cmWave, mmWave, etc.). The air interface 115/116/117 may be established using any suitable Radio Access Technology (RAT).

The base station 114b may communicate with one or more of the RRHs 118a and 118b, TRPs 119a and 119b, and/or RSUs 120a and 120b, over a wired or air interface 115b/116b/117b, which may be any suitable wired (e.g., cable, optical fiber, etc.) or wireless communication link (e.g., RF, microwave, IR, UV, visible light, cmWave, mmWave, etc.). The air interface 115b/116b/117b may be established using any suitable RAT.

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., RF, microwave, IR, ultraviolet UV, visible light, cmWave, mmWave, etc.) The air interface 115c/116c/117c may be established using any suitable RAT.

The WTRUs 102 may communicate with one another over a direct air interface 115d/116d/117d, such as Sidelink communication which may be any suitable wireless communication link (e.g., RF, microwave, IR, ultraviolet UV, visible light, cmWave, mmWave, etc.) The air interface 115d/116d/117d may be established using any suitable RAT.

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and/or RSUs 120a and 120b in the RAN 103b/104b/105b and the WTRUs 102c, 102d, 102e, and 102f, may implement a radio technology such as Universal Mobile Telecommunications System (UMTS) Terrestrial Radio Access (UTRA), which may establish the air interface 115/116/117 and/or 115c/116c/117c respectively using Wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 114a in the RAN 103/104/105 and the WTRUs 102a, 102b, 102c, and 102g, or RRHs 118a and 118b, TRPs 119a and 119b, and/or RSUs 120a and 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A), for example. The air interface 115/116/117 or 115c/116c/117c may implement 3GPP NR technology. The LTE and LTE-A technology may include LTE D2D and/or V2X technologies and interfaces (such as Sidelink communications, etc.) Similarly, the 3GPP NR technology may include NR V2X technologies and interfaces (such as Sidelink communications, etc.)

The base station 114a in the RAN 103/104/105 and the WTRUs 102a, 102b, 102c, and 102g or RRHs 118a and 118b, TRPs 119a and 119b, and/or RSUs 120a and 120b in the RAN 103b/104b/105b and the WTRUs 102c, 102d, 102e, and 102f may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 20A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like. The base station 114c and the WTRUs 102, e.g., WTRU 102e, may implement a radio technology such as IEEE 802.11 to establish a Wireless Local Area Network (WLAN). Similarly, the base station 114c and the WTRUs 102, e.g., WTRU 102d, may implement a radio technology such as IEEE 802.15 to establish a wireless personal area network (WPAN). The base station 114c and the WTRUs 102, e.g., WRTU 102e, may utilize a cellular-based RAT (e.g., WCDMA, CDMA2000, GSM, LTE, LTE-A, NR, etc.) to establish a picocell or femtocell. As shown in FIG. 20A, the base station 114c may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, messaging, authorization and authentication, applications, and/or Voice Over Internet Protocol (VoIP) services to one or more of the WTRUs 102. For example, the core network 106/107/109 may provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 20A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102 to access the PSTN 108, the Internet 110, and/or other networks 112. The PSTN 108 may include circuit-switched telephone networks that provide Plain Old Telephone Service (POTS). The Internet 110 may include a global system of interconnected computer networks and devices that use common communication protocols, such as the Transmission Control Protocol (TCP), User Datagram Protocol (UDP), and the internet protocol (IP) in the TCP/IP internet protocol suite. The other networks 112 may include wired or wireless communications networks owned and/or operated by other service providers. For example, the networks 112 may include any type of packet data network (e.g., an IEEE 802.3 Ethernet network) or another core network connected to one or more RANs, which may employ the same RAT as the RAN 103/104/105 and/or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links. For example, the WTRU 102g shown in Figure may be configured to communicate with the base station 114a, which may employ a cellular-based radio technology, and with the base station 114c, which may employ an IEEE 802 radio technology.

Although not shown in FIG. 20A, it will be appreciated that a User Equipment may make a wired connection to a gateway. The gateway may be a Residential Gateway (RG). The RG may provide connectivity to a Core Network 106/107/109. It will be appreciated that many of the ideas contained herein may equally apply to UEs that are WTRUs and UEs that use a wired connection to connect to a network. For example, the ideas that apply to the wireless interfaces 115, 116, 117 and 115c/116c/117c may equally apply to a wired connection.

Figure 20B:
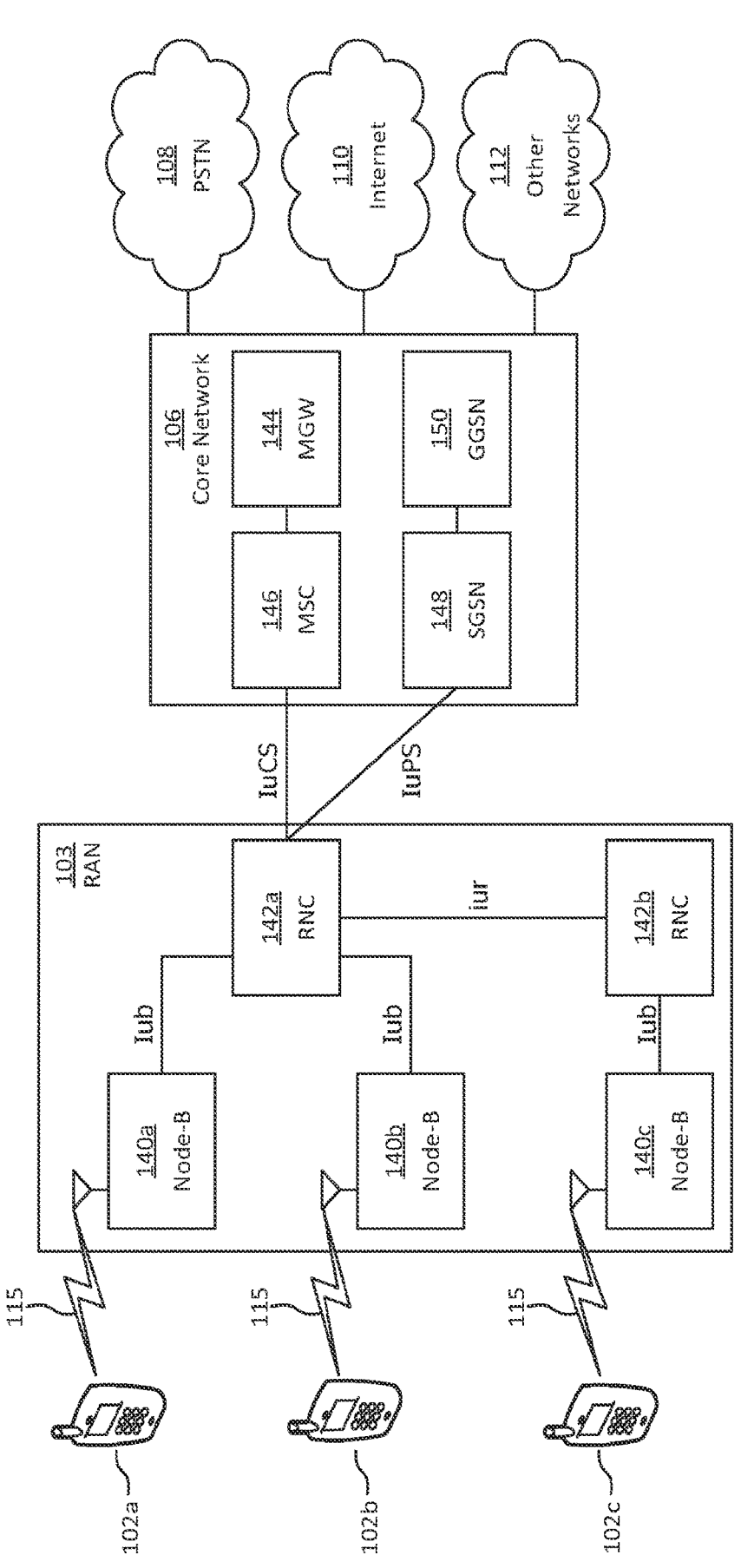
FIGS. 20B-D are system diagrams of example RANs and core networks.

FIG. 20B is a system diagram of an example RAN 103 and core network 106. As noted above, the RAN 103 may employ a UTRA radio technology to communicate with the WTRUs 102a, 102b, and 102c over the air interface 115. The RAN 103 may also be in communication with the core network 106. As shown in FIG. 20B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 20B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 20B may include a media gateway (MGW) 144, a Mobile Switching Center (MSC) 146, a Serving GPRS Support Node (SGSN) 148, and/or a Gateway GPRS Support Node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned and/or operated by other service providers.

Figure 20C:
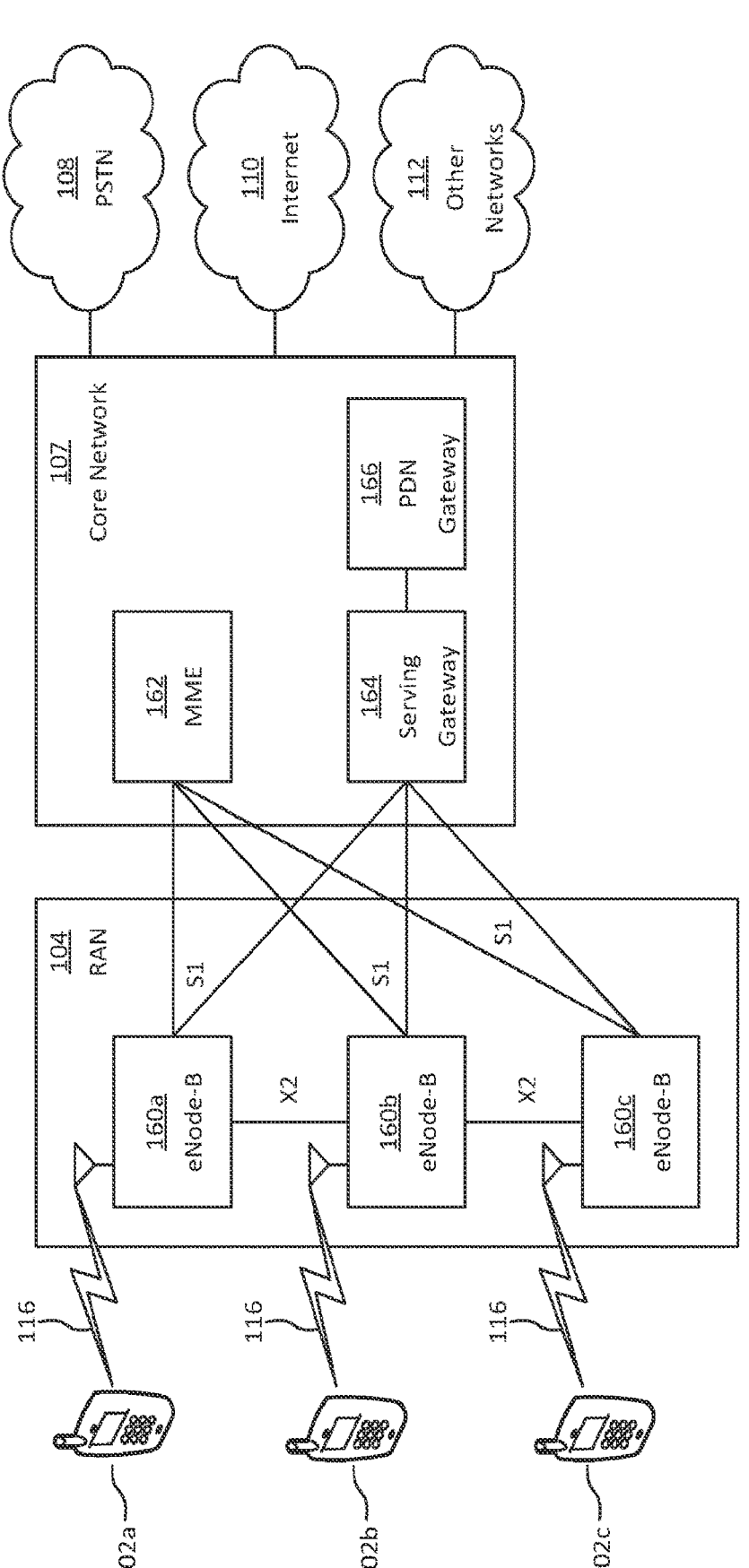

FIG. 20C is a system diagram of an example RAN 104 and core network 107. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in Figure the eNode-Bs 160a, 160b, and 160c may communicate with one another over an X2 interface.

The core network 107 shown in FIG. 20C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned and/or operated by other service providers.

Figure 20D:
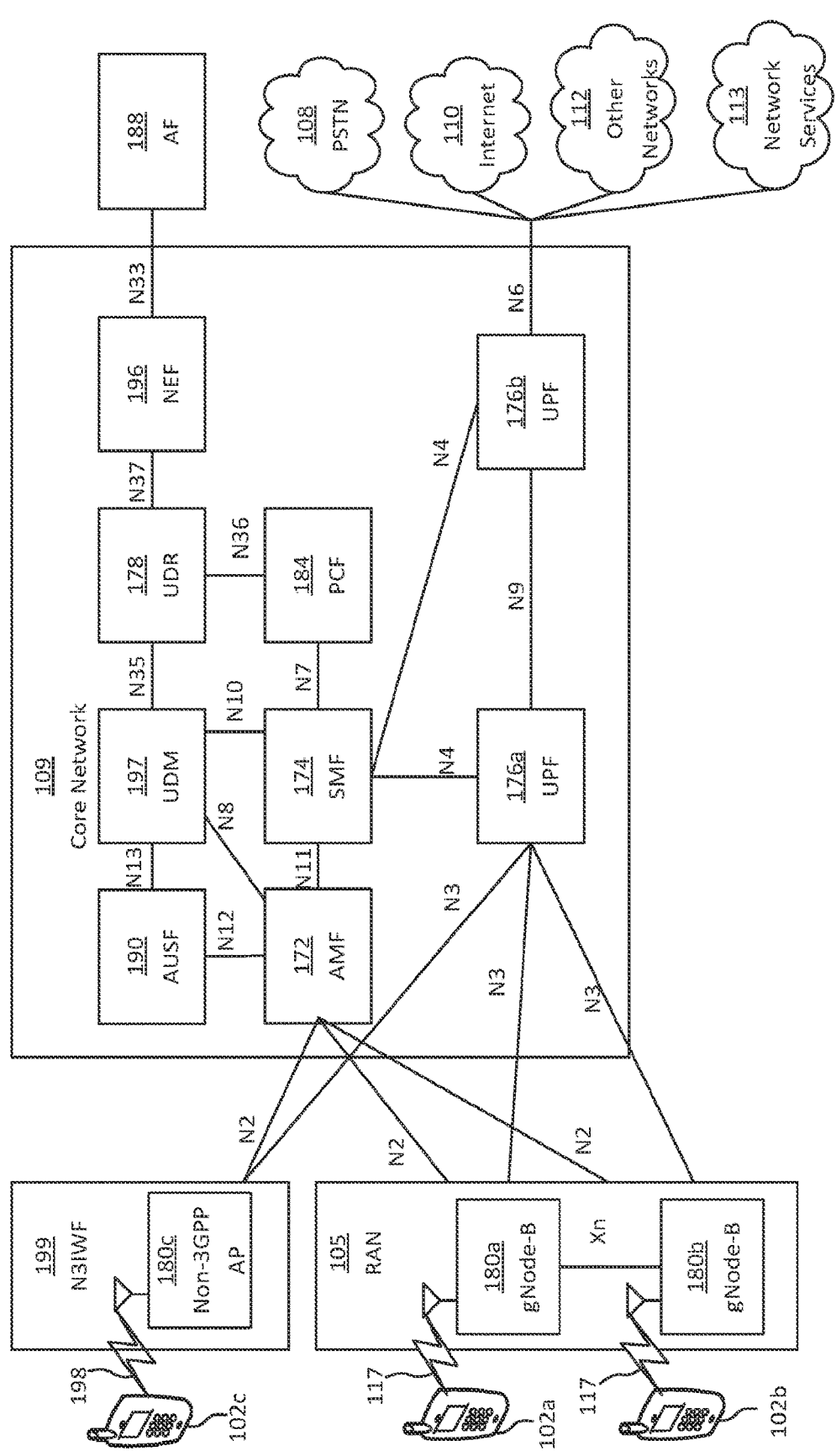

FIG. 20D is a system diagram of an example RAN 105 and core network 109. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, and/or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink and/or downlink, and the like. As shown in Figure the gNode-Bs 180a and 180b may communicate with one another over an Xn interface, for example.

The core network 109 shown in FIG. 20D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless and/or network communications or a computer system, such as system 90 illustrated in FIG. 20G.

In the example of FIG. 20D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned and/or operated by an entity other than the core network operator. It will also be appreciated that a 5G core network may not consist of all of these elements, may consist of additional elements, and may consist of multiple instances of each of these elements. FIG. 20D shows that network functions directly connect to one another, however, it should be appreciated that they may communicate via routing agents such as a diameter routing agent or message buses.

In the example of FIG. 20D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 20D.

The SMF 174 may be connected to the AMF 172 via an N11 interface. Similarly, the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 20D. The PCF 184 may provide policy rules to control plane nodes such as the AMF 172 and SMF 174, allowing the control plane nodes to enforce these rules. The PCF 184 may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface, and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g., in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 20D, in a network slicing scenario, a WTRU 102a, 102b, or 102c may connect to an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, which serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned and/or operated by other service providers.

The core network entities described herein and illustrated in FIG. 20A, FIG. 20C, FIG. 20D, and FIG. 20E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A-E are provided by way of example only, and it is understood that the subject matter disclosed and claimed herein may be embodied or implemented in any similar communication system, whether presently defined or defined in the future.

Figure 20E:
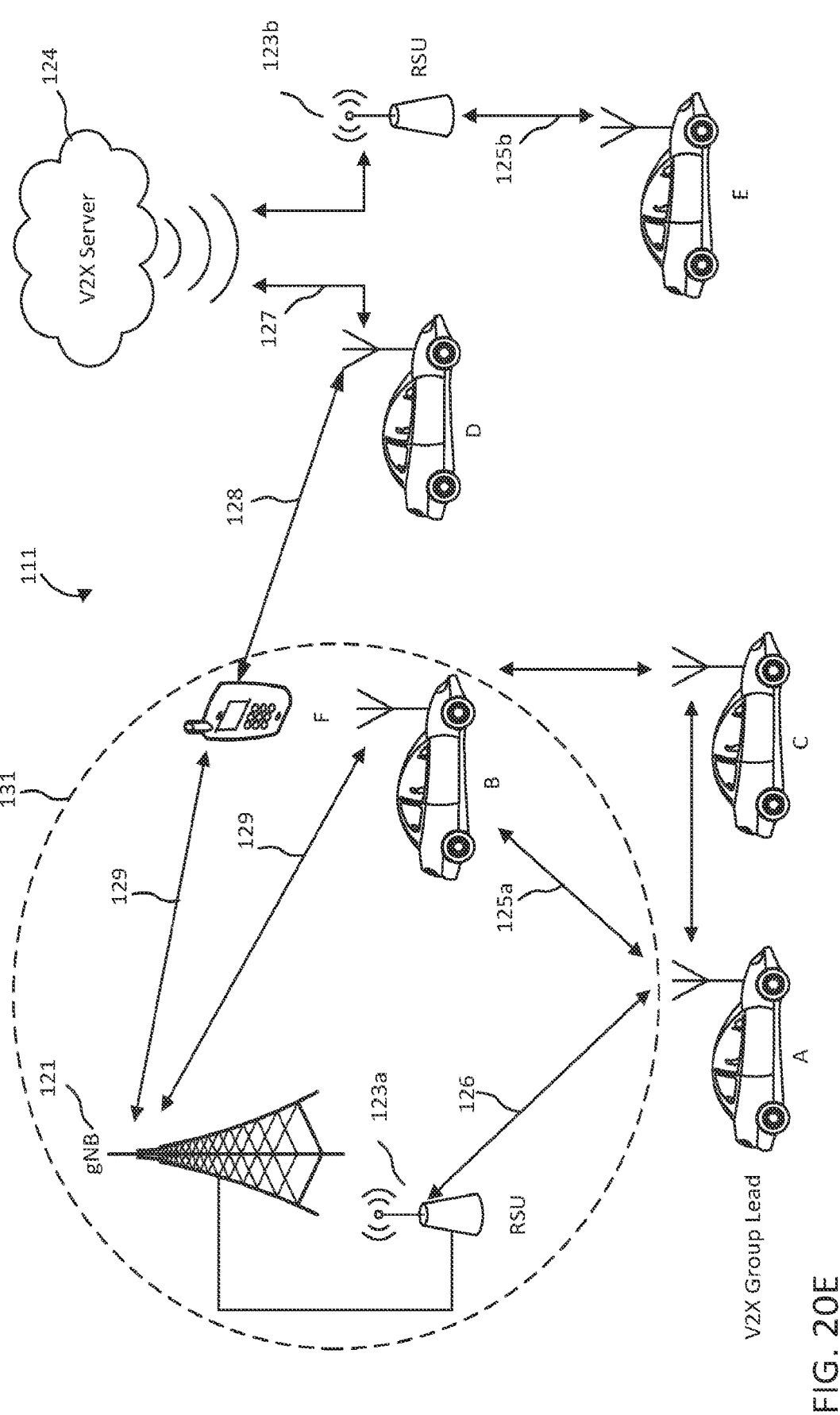
FIG. 20E illustrates another example communications system.

FIG. 20E illustrates an example communications system 111 in which the systems, methods, apparatuses described herein may be used. Communications system 111 may include Wireless Transmit/Receive Units (WTRUs) A, B, C, D, E, F, a base station gNB 121, a V2X server 124, and Roadside Units (RSUs) 123a and 123b. In practice, the concepts presented herein may be applied to any number of WTRUs, base station gNBs, V2X networks, and/or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 20E, WTRUs B and F are shown within access network coverage 131. WTRUs A, B, C, D, E, and F may communicate with each other directly via a Sidelink interface (e.g., PC5 or NR PC5) such as interface 125a, 125b, or 128, whether they are under the access network coverage 131 or out of the access network coverage 131. For instance, in the example of FIG. 20E, WRTU D, which is outside of the access network coverage 131, communicates with WTRU F, which is inside the coverage 131.

WTRUs A, B, C, D, E, and F may communicate with RSU 123a or 123b via a Vehicle-to-Network (V2N) 133 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 20F:
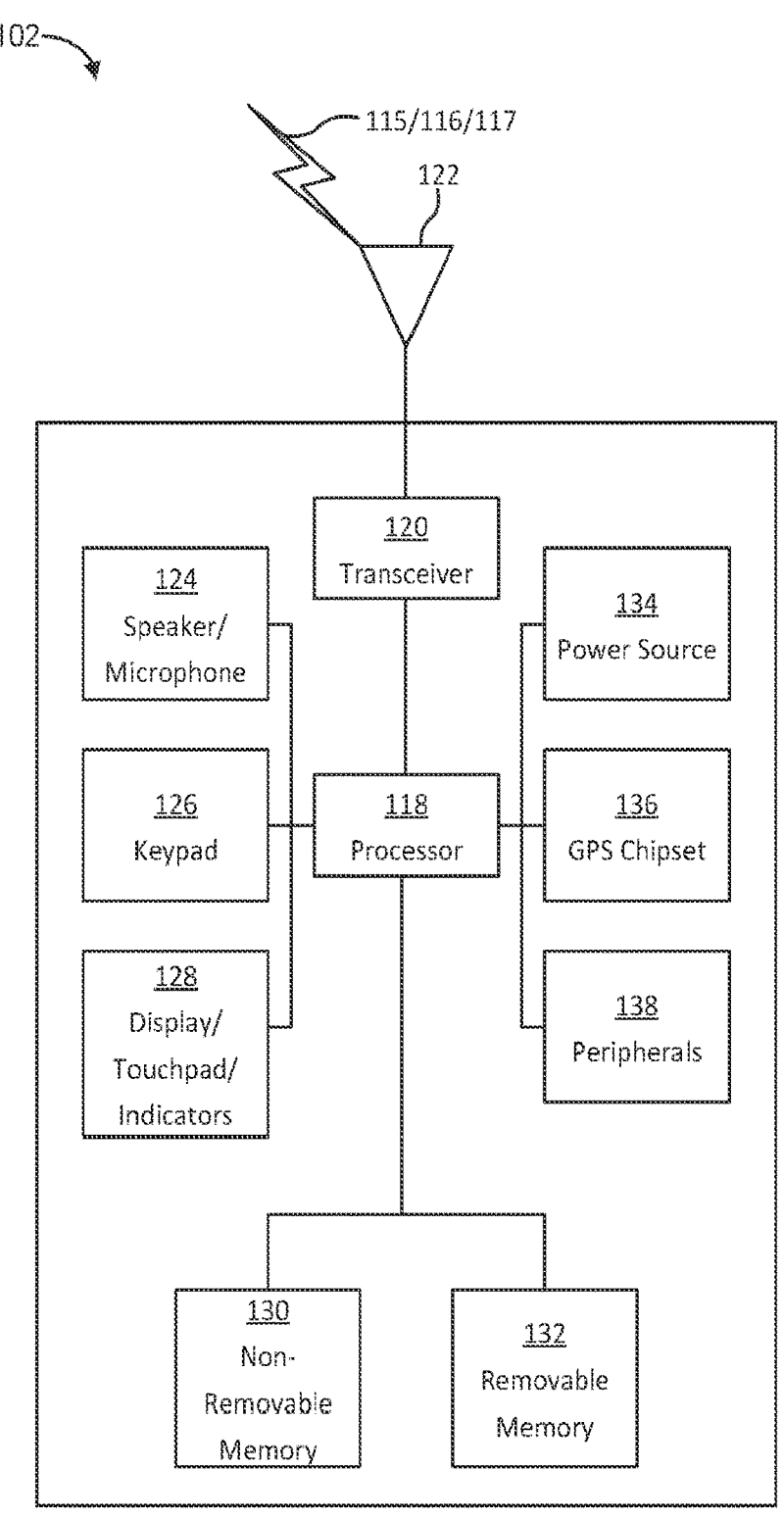
FIG. 20F is a block diagram of an example apparatus or device, such as a WTRU.

FIG. 20F is a block diagram of an example apparatus or device WTRU 102 that may be configured for wireless communications and operations in accordance with the systems, methods, and apparatuses described herein, such as a WTRU 102 of FIG. 20A, 1B, 1C, 1D, or 1E. As shown in FIG. 20F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any subcombination of the foregoing elements. Also, the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 20F and described herein.

The processor 118 may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 20F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 20A) over the air interface 115/116/117 or another UE over the air interface 115d/116d/117d. For example, the transmit/receive element 122 may be an antenna configured to transmit and/or receive RF signals. The transmit/receive element 122 may be an emitter/detector configured to transmit and/or receive IR, UV, or visible light signals, for example. The transmit/receive element 122 may be configured to transmit and receive both RF and light signals. It will be appreciated that the transmit/receive element 122 may be configured to transmit and/or receive any combination of wireless or wired signals.

In addition, although the transmit/receive element 122 is depicted in FIG. 20F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit. The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 20G:
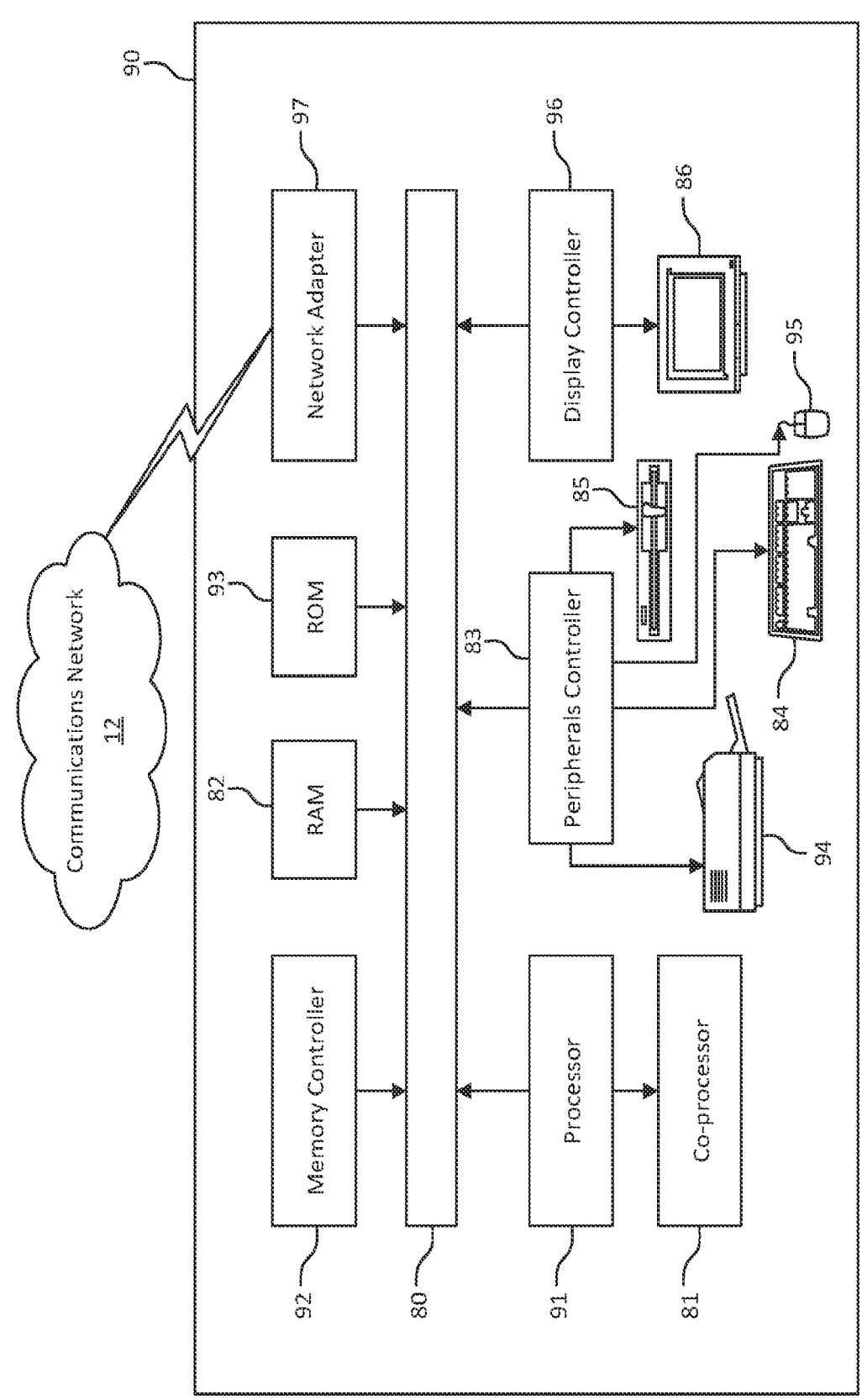
FIG. 20G is a block diagram of an exemplary computing system.

FIG. 20G is a block diagram of an exemplary computing system 90 in which one or more apparatuses of the communications networks illustrated in FIG. 20A, FIG. 20C, Figure and FIG. 20E may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIGS. 1A-1E, to enable the computing system 90 to communicate with other nodes or functional entities of these networks. The communication circuitry, alone or in combination with the processor 91, may be used to perform the transmitting and receiving steps of certain apparatuses, nodes, or functional entities described herein.

It is understood that any or all of the apparatuses, systems, methods, and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations, or functions described herein may be implemented in the form of such computer executable instructions, executing on the processor of an apparatus or computing system configured for wireless and/or wired network communications. Computer readable storage media includes volatile and nonvolatile, removable, and non-removable media implemented in any non-transitory (e.g., tangible, or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information, and which may be accessed by a computing system.

APPENDIX

TABLE 1

| Acronyms | |
|---|---|
| 3GPP | $3^{rd}$ Generation Partnership Project |
| 5G | 5th Generation |
| 5GS | 5G System |
| ACK | Acknowledgement |
| ARQ | Automatic Repeat Request |
| BM-SC | Broadcast Multicast Service Center |
| BWP | Bandwidth Part |
| DAPS | Dual Active Protocol Stack |
| DL-SCH | Downlink Shared Channel |
| DRB | Data Radio Bearer |
| DRX | Discontinuous Reception |
| eNB | enhanced Node B |
| E-UTRA | Evolved UMTS Terrestrial Radio Access |
| eMBMS | Enhanced MBMS |
| eMTC | enhanced Machine-Type Communication |
| FR2 | Frequency Range 2 (frequency bands from 24.25 GHz to 52.6 GHz) |
| gNB | 5G Node B |
| GPRS | General Packet Radio Service |
| G-RNTI | Group RNTI |
| GTP | GPRS Tunneling Protocol |
| GW | Gateway |
| HARQ | Hybrid ARQ |
| HO | Handover |
| IoT | Internet of Things |
| LTE | Long Term Evolution |
| MAC | Media/Medium Access Control |
| MBMS | Multimedia Broadcast Multicast services |
| MBMS GW | MBMS Gateway |
| MBS | Multicast/Broadcast Service |
| MBS GW | Multicast/Broadcast Service GW |
| MBSFN | Multicast-broadcast single-frequency network |
| MCCH | Multicast Control Channel |
| MCE | Multi-cell/multicast coordination entity |
| MCH | Multicast transport channel |
| MCS | Modulation and Coding Scheme |
| MooD | MBMS operation on Demand |
| MRB | Multicast/Broadcast Radio Bearer |
| MTCH | Multicast Traffic Channel |
| NACK | Negative ACK |
| NAS | Non-Access Stratum |
| NCL | Neighbor Cell List |
| NR | New Radio |
| PDCCH | Physical Downlink Control Channel |
| PDCP | Packet Data Convergence Protocol |
| PDSCH | Physical Downlink Shared Channel |
| PDU | Packet Data Unit |
| PMCH | Physical Multicast Channel |
| PTP | Point-to-Point |
| PTM | Point-to-Multipoint |
| QFI | QoS Flow Identifier |
| Qos | Quality of Service |
| RAN | Radio Access Network |
| RLC | Radio Link Control |
| RNTI | Radio Network Temporary Identifier |
| RRC | Radio Resource Control |
| RSRP | Reference signal received power |
| RSRQ | Reference Signal Received Quality |
| SAI | Service Area Identity |
| SC-MCCH | Single Cell MCCH |
| SC-MTCH | Single Cell MCTH |
| SC-PTM | Single Cell PTM |
| SC-RNTI | Single Cell RNTI |
| SDAP | Service Data Adaptation Protocol |
| SFN | Single Frequency Network |

TABLE 1-continued

| Acronyms | |
| --- | --- |
| SN | Sequence Number |
| SSB | Synchronization Signal Block |
| TBS | Transport Block Size |
| UE | User Equipment |
| UL | Uplink |
| UM | Unacknowledged Mode |
| UPF | User Plane Function |
| V2X | Vehicle to Anything |

What is claimed is:

1. A method comprising:

receiving multicast/broadcast service (MBS) information from a first base station, wherein the MBS information is associated with a serving cell or a neighbor cell;

based on the MBS information, setting a priority of continuity of MBS reception in relation to at least receiving a paging message;

based on the priority of the continuity of MBS reception, determining one or more cells that are offset to a lower ranking during a cell ranking procedure of a wireless transmit/receive unit (WTRU);

based on the one or more cells that are offset during the cell ranking procedure of the WTRU, reselecting a new cell; and receiving data, from the new cell, based on the MBS information, wherein the MBS information comprises an indication of whether MBS transmission progress is aligned with the serving cell.

2. The method of claim 1, wherein the MBS information comprises a priority threshold for unicast traffic.

3. The method of claim 1, wherein the MBS information comprises an inter-frequency measurement threshold.

4. The method of claim 1, wherein the MBS information comprises a maximum reselection delay timer indication.

5. The method of claim 1, wherein the MBS information comprises a list of neighbor cells.

6. The method of claim 1, wherein the MBS information comprises a list of frequencies over which the MBS is carried.

7. The method of claim 1, wherein the MBS information comprises a neighbor cell ranking offset for cell reselection evaluation.

8. The method of claim 1, wherein the MBS information comprises an indication of whether a base station of an intra-frequency neighbor cell can be triggered by an apparatus to start the MBS.

9. The method of claim 1, wherein the MBS information comprises an inter-frequency neighbor cell selection quality offset.

10. A wireless transmit/receive unit (WTRU) comprising:

a processor; and a memory coupled with the processor, the memory storing executable instructions that when executed by the processor cause the processor to effectuate operations to:

receive multicast/broadcast service (MBS) information from a first base station, wherein the MBS information is associated with a serving cell or a neighbor cell;

based on the MBS information, set a priority of continuity of MBS reception in relation to at least receiving a paging message;

based on the priority of the continuity of MBS reception, determine one or more cells that are offset to a lower ranking during a cell ranking procedure of the WTRU;

based on the one or more cells that are offset during the cell ranking procedure of the WTRU, reselect a new cell; and receive data, from the new cell, based on the MBS information, wherein the MBS information comprises an indication of whether MBS transmission progress is aligned with the serving cell.

11. The WTRU of claim 10, wherein the MBS information comprises a priority threshold for unicast traffic or an inter-frequency measurement threshold.

12. The WTRU of claim 10, wherein the MBS information comprises an inter-frequency measurement threshold.

13. The WTRU of claim 10, wherein the MBS information comprises a maximum reselection delay timer indication.

14. The WTRU of claim 10, wherein the MBS information comprises a list of neighbor cells.

15. The WTRU of claim 10, wherein the MBS information comprises a list of frequencies over which the MBS is carried.

16. The WTRU of claim 10, wherein the MBS information comprises a neighbor cell ranking offset for cell reselection evaluation.

17. The WTRU of claim 10, wherein the MBS information comprises an indication of whether a base station of an intra-frequency neighbor cell can be triggered by an apparatus to start the MBS.

18. The WTRU of claim 10, wherein the MBS information comprises an inter-frequency neighbor cell selection quality offset.

* * * * *